(12) United States Patent
Chandra

(10) Patent No.: US 9,323,870 B2
(45) Date of Patent: Apr. 26, 2016

(54) METHOD AND APPARATUS FOR IMPROVED INTEGRATED CIRCUIT TEMPERATURE EVALUATION AND IC DESIGN

(71) Applicant: Advanced Micro Devices, Inc., Sunnyvale, CA (US)

(72) Inventor: Rajit C. Chandra, Cupertino, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 13/874,925

(22) Filed: May 1, 2013

(65) Prior Publication Data

US 2013/0298101 A1 Nov. 7, 2013

Related U.S. Application Data

(60) Provisional application No. 61/641,122, filed on May 1, 2012.

(51) Int. Cl.
*G06F 17/50* (2006.01)

(52) U.S. Cl.
CPC .......... *G06F 17/50* (2013.01); *G06F 17/5018* (2013.01); *G06F 17/5045* (2013.01)

(58) Field of Classification Search
USPC .................. 716/104–106, 108–113, 136; 703/13–14, 19, 23; 702/130, 132, 136
See application file for complete search history.

(56) References Cited

U.S. PATENT DOCUMENTS

| | | | |
|---|---|---|---|
| 4,696,578 A | 9/1987 | Mansuria et al. | |
| 5,654,904 A | 8/1997 | Takur | |
| 5,710,068 A | 1/1998 | Hill | |
| 5,831,249 A | 11/1998 | Rohner et al. | |
| 5,838,578 A | 11/1998 | Pippin | |
| 5,927,853 A | 7/1999 | Christiaens et al. | |
| 5,997,174 A | 12/1999 | Wyland | |
| 6,124,635 A | 9/2000 | Kuwabara | |
| 6,172,337 B1 | 1/2001 | Johnsgard et al. | |
| 6,203,191 B1 | 3/2001 | Mongan | |
| 6,247,161 B1 | 6/2001 | Lambrecht et al. | |
| 6,320,201 B1 | 11/2001 | Corbett et al. | |
| 6,334,013 B1 | 12/2001 | Laming et al. | |
| 6,389,582 B1 | 5/2002 | Valainis et al. | |
| 6,505,326 B1 | 1/2003 | Farral et al. | |
| 6,532,570 B1 | 3/2003 | Mau | |
| 6,591,399 B1 | 7/2003 | Wyrzykowska et al. | |
| 6,591,402 B1 | 7/2003 | Chandra et al. | |
| 6,634,013 B2 | 10/2003 | Shinzawa | |

(Continued)

OTHER PUBLICATIONS

Ting-Yuan Wang et al., 3D Thermal-ADI—An Efficient Chip-Level Transient Thermal Simulator, ISPD'03, Apr. 6-9, 2003, Monterey, California, 8 pages.

(Continued)

*Primary Examiner* — Nghia Doan

(74) *Attorney, Agent, or Firm* — Faegre Baker Daniels LLP

(57) ABSTRACT

A method and apparatus generates thermal partitions for metal interconnects of an integrated circuit, based on interconnect self heat data and mutual heat data. Each of the thermal partitions includes data identifying thermally related interconnects and respective temperature values associated with each of the thermally related interconnects. Thermally related partitions that can be computed efficiently and simultaneously and the results then integrated using superposition for the full chips.

12 Claims, 20 Drawing Sheets

(56) References Cited

U.S. PATENT DOCUMENTS

| | | | |
|---|---|---|---|
| 6,662,345 | B2 | 12/2003 | Uchida et al. |
| 6,751,781 | B2 | 6/2004 | Lin et al. |
| 6,769,102 | B2 | 7/2004 | Frank et al. |
| 6,910,812 | B2 | 6/2005 | Pommer et al. |
| 6,931,369 | B1 | 8/2005 | Perry et al. |
| 6,993,742 | B2 | 1/2006 | Fryer et al. |
| 7,025,280 | B2 | 4/2006 | Kaushal et al. |
| 7,039,888 | B2 | 5/2006 | Steinmann et al. |
| 7,096,450 | B2 | 8/2006 | Gill et al. |
| 7,162,402 | B2 | 1/2007 | Daems et al. |
| 7,171,346 | B1 | 1/2007 | Recker et al. |
| 7,191,112 | B2 | 3/2007 | Demler et al. |
| 7,191,413 | B2 * | 3/2007 | Chandra et al. ............. 716/111 |
| 7,194,711 | B2 | 3/2007 | Chandra |
| 7,203,920 | B2 | 4/2007 | Chandra |
| 7,263,477 | B2 | 8/2007 | Chen et al. |
| 7,353,471 | B1 | 4/2008 | Chandra et al. |
| 7,383,520 | B2 | 6/2008 | Chandra |
| 7,401,304 | B2 | 7/2008 | Li et al. |
| 7,823,102 | B2 | 10/2010 | Chandra et al. |
| 8,286,111 | B2 * | 10/2012 | Chandra et al. ............. 716/110 |
| 2002/0050833 | A1 | 5/2002 | Jones et al. |
| 2003/0145296 | A1 | 7/2003 | Chandra et al. |
| 2003/0226122 | A1 | 12/2003 | Hathaway et al. |
| 2005/0044515 | A1 | 2/2005 | Acar et al. |
| 2005/0058178 | A1 | 3/2005 | Shih et al. |
| 2005/0138581 | A1 | 6/2005 | Usui |
| 2005/0149886 | A1 | 7/2005 | Kaushal et al. |
| 2005/0155004 | A1 | 7/2005 | Miura et al. |
| 2005/0210425 | A1 | 9/2005 | Keller et al. |
| 2006/0031794 | A1 | 2/2006 | Li et al. |
| 2007/0120239 | A1 | 5/2007 | Chandra |
| 2007/0244676 | A1 * | 10/2007 | Shang et al. ................... 703/2 |
| 2009/0224356 | A1 * | 9/2009 | Chandra ............. G06F 17/5009 257/499 |

OTHER PUBLICATIONS

Ting-Yuan Wang et al., Thermal-ADI—A Linear-Time Chip-Level Dynamic Thermal-Simulation Algorithm Based on Alternating-Direction-Implicit (ADI) Method, IEEE Transactions on Very Large Scale Integration (VLSI) systems, vol. 11, No. 4, Aug. 2003, pp. 691-700.

Ting-Yuan Wang et al., 3D Thermal-ADI: A Linear-Time Chip Level Transient Thermal Simulator, IEEE Transactions on Computer-Aided Design of Integrated Circuits and Systems, vol. 21, No. 12, Dec. 2002, pp. 1434-1445.

Ting-Yuan Wang et al., Thermal-ADI: A Linear-Time Chip-Level Dynamic Thermal Simulation Algorithm Based on Alternating-Direction-Implicit (ADI) Method, ISPD'01, Apr. 1-4, 2001, Sonoma, California, 6 pages.

"Design Flow", Carleton University, Copyright John Knight, Revised; Sep. 30, 2003, pp. 1-22.

"Stratix II High-Speed Development Board", Data Sheet, Altera Corporation, Sep. 2004, ver.1.0, pp. 1-85.

Szekely V. et al.: "A thermal benchmark chip: design and applications", Part A, IEEE Transactions on Components, Packaging, and Manufacturing Technology, vol. 21, No. 3, Sep. 1998, pp. 399-405.

Andrew Labun et. al., "Rapid Detailed Temperature Estimation for Highly Coupled IC Interconnect," IEEE Transaction of Computer Aided Design of Integrated Circuits and Systems, vol. 27, No. 10, Oct. 2008, pp. 1840-1851.

Chuan Xu et. al. "Fast 3-D Thermal Analysis of Complex Interconnect Structures Using Electrical Modeling and Simulation Methodologies", International Conference on Computer Aided Design Digest of Technical Papers, pp. 658-665. Nov. 2009.

Luigi Pietro Maria Colombo et. al., "A Model of BGA Thermal Vias as an Example of Lumped Parameter Analysis in Thermal Modeling of SIPs and Stacked Die Packages," Proc IEEE vol. 97, No. 1, Jan. 2009, pp. 70-77.

Bohua Wang et al "Accelerated Chip-Level Thermal Analysis Using Multilayer Green Function," IEEE Trans on CAD of Integrated Circuits an Systems, vol. 26, No. 2, Feb. 2007, pp. 325-344.

Wim Van Petegem et al "Electrothermal Simulation and Design of Integrated Circuits," IEEE Journal of Solid-State Circuits, vol. 29, No. 2, Feb. 1994 pp. 143-146.

R. Linstead and R. Surty, "Steady-state junction temperatures of semiconductor chips," IEEE Trans. Electron Devices, vol. 19, No. 1, pp. 41-44, Jan. 1992.

Yuejin Huo et al., "Requirement for Accurate Interconnect Temperature Measurement for Electromigration Test," 2009, pp. 552-525.

Hang L. et al.: "Efficient thermal stimulation for run-time temperature tracking and management", Computer Design: VLSI in Computers and Processors, ICCD 2005 Proceedings, IEEE International Conference Oct. 2-5, 2005, 4 pages.

Roger Paul Stout, P.E. And David T. Billings, "How to Extend a Thermal-RC-Network Model (Derived from Experimental Data) to Respond to an Arbitrarily Fast Input," Fourteenth IEEE SEMI-THERMTM Symposium, pp. 8-15.

http://en.wikipedia.org/wiki/Parasitic_extraction#Tools_and_vendors; Oct. 7, 2015.

Yonghong Yang et al.; Adaptive Chip-Package Thermal Analysis for Synthesis and Design; Design, Automation and Test in Europe, 2006. Date '06. Proceedings; Mar. 6-10, 2006; 6 pgs.

Yonghong Yang et al.; Adaptive multi-domain thermal modeling and analysis for integrated circuit synthesis and design; Computer-Aided Design, ICCAD '06. IEEE/ACM International Conference, Nov. 2006; pp. 575-582.

Kaustav Banerjee et al., High-Current Failure Model for VLSI Interconnects Under Short-Pulse Stress Conditions, IEEE Electron Device Letters, vol. 18, No. 9, Sep. 1997, pp. 405-407.

Kaustav Banerjee et al., The Effect of Interconnect Scaling and Low-k Dielectric on the Thermal Characteristics of the IC Metal, Electron Devices Meeting, 1996, International, Dec. 8-11, 1996, San Francisco, CA, USA, pp. 65-68.

Wei Huang et al., 51.3 Compact Thermal Modeling for Temperature-Aware Design, HPLP and LAVA labs, Departments of ECE and CS, University of Virginia, Jun. 10, 2004, 27 pgs.

Wei Huang et al., Compact Thermal Modeling for Temperature-Aware Design, DAC 2004 Jun. 7-11, 2004, San Diego, California, USA, pp. 878-883.

Amir H. Ajami et al., Analysis of Non-Uniform Temperature-Dependent Interconnect Performance in High Performance !Ics, DAC'01, Jun. 18-22, 2001, Las Vegas, Nevada, USA, 6 pgs.

Kaustav Banerjee et al., Analysis and Optimization of Thermal Issues in High-Performance VLSI, ISPD'01, Apr. 1-4, 2001, Sonoma, California, USA, pp. 230-237.

Kaustav Banerjee et al., Analysis and Optimization of Thermal Issues in High Performance VLSI, Presentation Outline, ISPD 2001, 57 slides on 10 pgs.

Amir H. Ajami et al., Non-Uniform Chip-Temperature Dependent Signal Integrity, Digest of Technical Papers, 2001 Symposium on VLSI Technology, Jun. 12-14, 2001, Kyoto, Japan, 2 pgs.

Amir H. Ajami et al., Effects of Non-uniform Substrate Temperature on the Clock Signal Integrity in High Performance Designs, IEEE Conference on Custom Integrated Circuits, San Diego, CA, USA, May 6-9, 2001, 4 pgs.

Amir H. Ajami et al., Effects of Non-Uniform Substrate Temperature on the Clock Signal Integrity in High Performance Designs, Presentation Outline, CICC'01, May 8, 2001, 26 slides on 5 pgs.

Ting-Yuan Wang et al., SPICE-Compatible Thermal Simulation with Lumped Circuit Modeling for Thermal Reliability Analysis based on Modeling Order Reduction, Proceedings of the 5th International Symposium on Quality Electronic Design, Mar. 22-24, 2004, 6 pgs.

Peng Li, Efficient Full-Chip Thermal Modeling and Analysis, Proceedings of the 2004 IEEE/ACM International conference on Computer-aided design, Nov. 7-11, 2004, pp. 319-326.

Vladimir Koval et al., MONSTR: a complete thermal simulator of electronic systems, Proceedings of the 31st annual conference on Design Automation, San Diego, California, Jun. 6-10, 1994, 6 pgs.

Rajit Chandra, A thermal-aware IC design methodology, http://www.eetimes.com/showArticle.jhtml?articleID=164302273&printable=tr- ue, Jun. 13, 2005, 7 pgs.

(56) References Cited

OTHER PUBLICATIONS

Sheng-Chih Lin and Kaustav Banerjee, "Cool Chips: Opportunities and Implications for Power and Thermal Management", IEEE Transactions on Electron Devices, vol. 55, No. 1, Jan. 2008 pp. 245-255.
The International Technology Roadmap for Semiconductors, 2003 Edition, Executive Summary, published by the Semiconductor Industry Association et al., 2003; 75 pages.
The International Technology Roadmap for Semiconductors, 2003 Edition, System Drivers, published by the Semiconductor Industry Association et al., 2003; 24 pages.
The International Technology Roadmap for Semiconductors, 2003 Edition, Design, published by the Semiconductor Industry Association et al., 2003; 43 pages.
The International Technology Roadmap for Semiconductors, 2003 Edition, Test and Test Equipment, published by the Semiconductor Industry Association et al., 2003; 63 pages.
The International Technology Roadmap for Semiconductors, 2003 Edition, Process Integration, Devices and Structures; Includes RF and Analog/Mixed-Signal Technologies for Wireless Communications and Emerging Research Devices, published by the Semiconductor Industry Association et al., 2003; 41 pages.
The International Technology Roadmap for Semiconductors, 2003 Edition, Radio Frequency and Analog/Mixed-Signal Technologies for Wireless Communications [A Section of the Process Integration Chapter], published by the Semiconductor Industry Association et al., 2003; 40 pages.
The International Technology Roadmap for Semiconductors, 2003 Edition, Emerging Research Devices, published by the Semiconductor Industry Association et al., 2003; 53 pages.
The International Technology Roadmap for Semiconductors, 2003 Edition, Front End Processes, published by the Semiconductor Industry Association et al., 2003; 62 pages.
The International Technology Roadmap for Semiconductors, 2003 Edition, Lithography, published by the Semiconductor Industry Association et al., 2003; 20 pages.
The International Technology Roadmap for Semiconductors, 2003 Edition, Interconnect, published by the Semiconductor Industry Association et al., 2003; 45 pages.
The International Technology Roadmap for Semiconductors, 2003 Edition, Factory Integration, published by the Semiconductor Industry Association et al., 2003; 42 pages.
The International Technology Roadmap for Semiconductors, 2003 Edition, Assembly and Packaging, published by the Semiconductor Industry Association et al., 2003; 24 pages.
The International Technology Roadmap for Semiconductors, 2003 Edition, Environment, Safety, and Health, published by the Semiconductor Industry Association et al., 2003; 27 pages. cited.
The International Technology Roadmap for Semiconductors, 2003 Edition, Yield Enhancement, published by the Semiconductor Industry Association et al., 2003; 39 pages.
The International Technology Roadmap for Semiconductors, 2003 Edition, Metrology, published by the Semiconductor Industry Association et al., 2003; 40 pages.
The International Technology Roadmap for Semiconductors, 2003 Edition, Modeling and Simulation, published by the Semiconductor Industry Association et al., 2003; 27 pages.
Yi-Kan Cheng, Prasun Raha, Chin-Chi Teng, Elyse Rosenbaum, Sung-Mo Kang; Illiads-T: An Electrothermal Timing Simulator for Temperature-Sensitive Reliability Diagnosis of CMOS VLSI Chips; IEEE Transactions on Computer-Aided Design of Integrated Circuits and Systems, vol. 17, No. 8, Aug. 1998, pp. 668-681.
Sven Rzepka, Kaustav Banerjee, Ekkehard Meusel, and Chenming Hu; Characterization of Self-Heating in Advanced VLSI Interconnect Lines Based on Thermal Finite Element Simulation; IEEE Transactions on Components, Packaging, and Manufacturing Technology—Part A, vol. 21, No. 3, Sep. 1998, pp. 406-411.
Kaustav Banerjee, Amit Mehrotra, Alberto Sangiovanni-Vincentelli, Chenming Hu; On Thermal Effects in Deep Sub-Micron VLSI Interconnects; Proceedings of IEEE/ACM DAC 1999, pp. 885-891.
Ting-Yen Chiang, Kaustav Banerjee, Krishna C. Saraswat; Comact Modeling and SPICE-Based Simulation for Electrothermal Analysis of Multilevel ULSI Interconnects; Proceedings of IEEE/ACM ICCAD, 2001, pp. 165-172.
Zhiping Yu, Daniel Yergeau, Robert W. Dutton, Sam Nakagawa, and Jeff Deeney; Fast Placement-Dependent Full Chip Thermal Simulation; Proceedings of International Symposium on VLSI Technology, Systems and Applications, 2001, pp. 249-252.
Haihua Su, Frank Liu, Anirudh Devgan, Emrah Acar, Sani Nassif; Full Chip Leakage Estimation Considering Power Supply and Temperature Variations; ISLPED'03, Aug. 25-27, 2003, Seoul, Korea, pp. 78-83.
Kevin Skadron, Mircea R. Stan, Wei Huang, Sivakumar Velusamy, Karthik Sankaranarayanan, and David Tarjan; Temperature-Aware Microarchitecture; Proceedings of the 30th International Symposium on Computer Architecture, 2003, 12 pages.
Ching-Han Tsai and Sung-Mo (Steve) Kang; Cell-Level Placement for Improving Substrate Thermal Distribution; IEEE Transactions on Computer-Aided Design of Integrated Circuits and Systems, vol. 19, No. 2, Feb. 2000, pp. 253-266.
Brent Goplen and Sachin Sapatnekar; Efficient Thermal Placement of Standard Cells in 3D ICs using a Force Directed Approach; Proceedings of the International Conference on Computer Aided Design (ICCAD'03), pp. 86-89.
Gary B. Kromann; Thermal Management of a C4/Ceramic-Ball-Grid Array: The Motorola PowerPC603TM and PowerPC604TM RISC Microprocessors; Twelfth IEEE SEMI-THERMTM Symposium, 1996, pp. 36-42.
Stephen H. Gunther, Frank Binns, Douglas M. Carmean, Jonathan C. Hall; Managing the Impact of Increasing Microprocessor Power Consumption; Intel Technology Journal Q1, 2001, 9 pages.
Tomas Skalicky; LASPack Reference Manual (version 1.12.2), Dresden University of Technology Institute for Fluid Mechanics, Aug. 13, 1995, 52 pages.
Vivek De and Shekhar Borkar; Technology and Design Challenges for Low Power and High Performance; Proceedings of the International Symposium Low Power Electronics and Design, San Diego, CA, 1999, pp. 163-168.
James R. Black, Electromigration Failure Modes in Aluminum Metallization for Semiconductor Devices; Proceedings of the IEEE, vol. 57, No. 9, Sep. 1969, 14 pages.
Andrew Smith, "Vertical Die Stacking goes 3D without TSV ", http://www.electroiq.com/index/display/packaging-article-display/5625661505/articles/advanced-packaging/packaging0/integration/die-stacking/2010/10/vertical-die-stacking-goes-3d-without-tsv.html; Oct. 28, 2010.

* cited by examiner

| DISTANCE FROM CENTER OF INTERCONNECT CONFIGURATION | NORMALIZED TEMPERATURE CONTRIBUTION TO VICTIM INTERCONNECTS |
|---|---|
| 0 | 1 |
| 0.015 | 0.9963759 |
| 0.02 | 0.9873155 |
| 0.025 | 0.9780976 |
| 0.03 | 0.9688797 |
| 0.035 | 0.9596617 |
| 0.04 | 0.9509165 |
| 0.045 | 0.942644 |
| 0.05 | 0.9343716 |
| 0.055 | 0.9260991 |
| 0.06 | 0.9178528 |

FIG. 13

METHOD AND APPARATUS FOR IMPROVED INTEGRATED CIRCUIT TEMPERATURE EVALUATION AND IC DESIGN

RELATED CO-PENDING APPLICATION

This application claims priority to Provisional Application Ser. No. 61/641,122, filed on May 1, 2012, having inventor Rajit C. Chandra, titled "METHOD AND APPARATUS FOR IMPROVED INTEGRATED CIRCUIT TEMPERATURE EVALUATION AND IC DESIGN", and is incorporated herein by reference.

BACKGROUND OF THE DISCLOSURE

The disclosure relates generally to a method and apparatus for calculating the temperature or temperature profile of one or more integrated circuits.

Stacked semiconductor chips architectures include one or more integrated circuit designs with interconnecting structures between chips and between chips and package and between package and the printed circuit board, where the interconnect structures may be placed in the vertical, horizontal or angular planes. The stacked chip architectures are built in accordance with one or more of various descriptions, such as hardware description languages, circuit netlists, mask layer descriptions, layout databases, package architectures, heatsink specifications, mechanical and electrical component descriptions, material stacks, topologies and properties, thermal management system specifications, semiconductor chip-package system specification which may include description of component chips and their interconnections. Example chip descriptions include: Verilog, VHDL, SPICE, SPICE variants such as PSpice, IBIS, LEF, DEF, GDS-II, OASIS, or other descriptions for chip designs and example package descriptions include: ADP (Advanced Package Design) format or dot MCM files, GERBA, JEDEC standard formats, XML, Spread sheet formats, CATIA, compact models (with thermal resistors and capacitances) or other descriptions for package designs.

As shown in FIG. 1, a semiconductor chip package 100 or stack may include one or more semiconductor chips 101a-e (hereinafter collectively referred to as "semiconductor chips"), such as CPU, GPU, DRAM, PHY, PLL, Microcontrollers, memory controllers, graphics controllers, DSPs, I/O, CMOS Sensors, Amplifiers, Video and Audio transmitter-receivers chips each containing transistors, resistors, capacitors, diodes and the like deposited upon a substrate and coupled via differing forms of electrical interconnects such as a plurality of wires, micro bumps 102a, bumps 102b, through-silicon-via (TSV) 102d, chip level metal, BEOL (back-end-of-line) interconnects and RDL (Redistribution Layer), Backside Metal (MB), intermediate to global interconnects and the pads, wire bonds, C4 bumps in a flip chip process, micro-bumps connecting chip to chip in Face to Face packaging, Face to Back or Back to Back configurations or interconnects (hereinafter collectively referred to as "interconnects"). The semiconductor chips and interconnects are packaged in any one or a combination of package architectures including but not limited to PoP, WLP, 3D-IC, with or without TSV, WB, and any variations and/or combinations of chip-package designs including but not limited to horizontal structures such as wire-bonding type and flip-chip type, stacked structures with interposer 101n such as wire-bonding type, wire-bonding with flip-chip, flip-chip type or stacked structures with interposer-less structures including through terminal via type, embedded structures including wafer-level-packaged chip 103 with chip on surface and full 3D embedded chip structure, die on wafer, wafer on wafer, system on silicon, system in package; multi-tier wire-bonded packaging; (hereinafter collectively referred to as "packages").

The semiconductor chips 101 and interconnects 102 share electrical power, which generates heat and thermal gradients and hotspots develop in the interconnect structures. The gradients can range from single digit numbers to several 10s of degrees Celsius. The maximum-temperature hotspots can be in excess of the specified temperatures for acceptable performance and reliable functioning of the design.

Traditionally semiconductor on-chip interconnect reliability is analyzed in terms of MTF (median time to failure) and/or FIT (failures in time) and/or mean time between failure (MTBF). Interconnect failure mechanisms arise due to a combination of electrical and mechanical effects that are influenced by temperature, material and structural properties. To avoid this, failure manufacturing rules impose constraints on interconnect temperatures. For example due to low ILD thermal conductivity the maximum temperature hotspots in the die may be on an interconnect, where it needs to be maintained within allowable limits; in some scenarios the temperature differences (or gradients) across certain types of circuit interconnects in the design may be required to remain within specified bounds; in some scenarios the temperature on the interconnecting structures within the chips and/or between chips and/or between package and chip and/or between package and package and/or between package and board must remain within specified bounds; in some scenarios the electrical DC or AC current and/or current density and/or the temperature on the interconnect must be within certain specified bounds to avoid electromigration failure. In some scenarios thermal-stresses and strain fields of the structural components need to remain within prescribed limits so as not to have permanent deformation or fracture occur to them.

Compression stress is known to cause hillocks on interconnects which can cause short circuits; tensile stress is known to cause voids in interconnects which can lead to open circuits. In some scenarios the deformation may be elastic or plastic and/or be time dependent and/or temperature dependent such as creep deformation or fracture which may be caused by excessive stress or due to fatigue and be time and/or temperature dependent. In some scenarios the deformation may apply to any linear region, any area or to any volume of the chip-package system. Thermal stress may develop as the temperature variations within the semiconductor chips act upon their surrounding materials attempting to change their dimensions but are restrained by their structural boundaries. The magnitudes of unrestrained changes in dimensions are a function of temperature, CTE (property of the material), and dimensions of the structures. However, when the structural changes are restrained reaction forces develop as stresses within the structures causing deformation. Temperature induced problems are known to cause reliability failures in 2D chips and the problems are exacerbated by thermal coupling within the 3D stacked chip designs. For example the microbump layer has thousands of metal connections that are subjected to cyclic changes in temperature changes based on the workload and power dissipation of the semiconductor chips connected to it resulting in uneven heating and temperature gradients across the microbump material layer. The thermal stress combined with temperature values and current density of microbumps can cause electromigration and reduce the lifetime expectancy of the product. In some cases the material property may become affected increasing the electrical resistance and reducing the current flow in some of the microbumps causing the current load to be redistributed and thereby increasing the current load and temperatures in some other microbumps that can eventually cause a positive feedback loop that can lead to failure of the operating parts. Thus there is a need for interconnect thermal analysis to provide life and performance prediction of semiconductor chips and stacked chip-package products at the design stage.

Knowing temperature of interconnects (within a die and between dies) can (a) help to better estimate FIT rate and life time prediction based on reliability metrics for the product, (b) avoid costly layout changes due to overly pessimistic temperature assumptions. Narrow wires and other small scale interconnect structures require fine meshes that have large numbers (millions) of nodes and that result in time-consuming computations that require large amounts of computer memory which limit the capacity of even modern day computers. Without high resolution meshing the narrow and/or smaller-geometry interconnect temperatures cannot be accurately calculated nor can the calculated temperatures be annotated on interconnects. Interconnects can have multiple segments with each segment requiring a separate temperature value. Annotation requires calculated temperatures be located on the physical boundaries of interconnects and reported in a ASCII file or on a visual display (as in a GUI) with symbolic identity and/or physical locations and respective temperature values. In other words, the mesh based interconnect methods as it exists in current technology, are not scalable for large full chip analysis.

Additionally stacked chip interconnects vary from fine scale geometries (nanometers) to tens of microns to millimeters with different shapes ranging from rectangular to spherical and other types of structures with variations in the materials used for different types of interconnects. The number of interconnect shapes requiring analysis can be in the order of billions, each of which can represent a heat generating or conducting path. The said practical limitations in computation-time and capacity of existing interconnect thermal analysis methods constrains the analysis to small regions or grids of a large design such as on sections of semiconductor chips and/or across devices for example on power transistor circuits that can draw large currents. Moreover, the physical layout of semiconductor chips are in a different format and database which is traditionally based on GDSII and have mostly rectilinear geometries; package geometries can be different. For example, package interconnect wires may be curved and extend in three dimensions unlike those within a semiconductor chip. Known thermal solvers can provide FEA (finite element analysis) analysis on such structures but when shapes change, it would be desirable to accommodate changes in a manner that is more efficient than current thermal solver techniques. Different tools, methods and design flows between the chip and package designers are used in the respective domains for thermal analysis. In 3D stacked chip designs the chips and packages are integrated and assembled in specific architectures. The use of different analysis tools and methods for the chips and package respectively poses potential inconsistencies and inefficiencies in thermal analysis of interconnect structures.

To accurately estimate interconnect temperatures a plurality of determining factors need to be taken into account, such as: (a) self-heat which is the temperature caused by the power dissipated by that interconnect, the power can be average power, peak power, root mean square power or measured values; (b) mutual heating or cooling due to heat generated and/or conducted away from an interconnect structure, such as a wire, or other interconnect structures in the surrounding neighborhood; (c) thermal management system effects and (d) materials used in the semiconductor chip design and manufacturing that influence the heat transport paths. In the general nomenclature regarding the wire that is affected by the heating or cooling influence of others is called a victim while the influencing interconnects are called aggressors. The temperature of a victim interconnect is influenced by its location, size, shape, length, width, thickness, orientation, power density, thermal conductivity, electrical resistivity and neighboring interconnects' location, sizes, shapes, lengths, widths, thicknesses, orientations, power density, thermal conductivity, electrical resistivity topologies and also by the thermal characteristics of the semiconductor chips, package architectures and heat sinks. For example, interconnects are embedded in electrically non-conducting dielectric material to prevent short circuits. The dielectric materials are poor conductors of heat which deters heat escape from interconnects to the chip substrate and finally to the heat sinks. This causes the interconnect heat profiles to have long and gradual dissipation profiles in the horizontal plane. Coupling of heat in the vertical direction also exists. Temperature of any interconnect is thus affected by instance (or context) specific parameters within a spatial radius around the interconnect.

Thermal analysis involves solving the heat equation which can be stated in a general form by:

$$\rho c v \frac{\partial T}{\partial t} = \nabla (k \nabla T) + \sigma, \tag{1}$$

where $\rho$ is density, Cv is specific heat capacity at constant volume; k is thermal conductivity; $\sigma$ is heat generation density. In some variations the material constants may vary as a function of the temperature and dimensions of the heat conductive regions.

Those skilled in the art will appreciate that heat equations can be solved in a number of ways including but not limited to integral methods, analytical, finite element, finite difference, finite volume, Monte Carlo and multi-grid techniques. The limitations of analytically derived solutions such as Fourier series expansion (as exemplified by (2)) with simplified boundary conditions, using well known separation of variables method for solving the heat equations in 3D is limited in its ability to solve interconnect temperatures as the simplified $$T(x, y, z) = \sum_{i=0}^{\infty} \sum_{j=0}^{\infty} \frac{\sin\frac{i\pi\lambda}{a} \sin\frac{j\pi\lambda}{a} \cos\frac{i\pi x}{a} \cos\frac{j\pi y}{a} \sinh\frac{\sqrt{i^2+j^2}\pi z}{a}}{(1+\delta i)i\pi(1+\delta j)j\pi \frac{\sqrt{i^2+j^2}\pi d}{a} \cosh\frac{\sqrt{i^2+j^2}\pi d}{a}} \tag{2}$$

Assumptions on boundary conditions do not adequately account for the interconnect temperature contributions by the aggressor to its thermally coupled victims; if realistic boundary conditions were to be set up it would make the solution unwieldy and excessively time-consuming for interconnect structures in real-life examples of IC and stacked chip designs. Mesh based thermal solvers on the other hand provide the accuracy needed by electro-thermal and electro-mechanical analysis but they are computationally prohibitively time-consuming when applied to very large semiconductor chip designs with billions of shapes representing interconnects, and sometimes capacity limited, or limited in their ability to model the details of the heat transfer paths in full chip and chip-package systems, non-linear effects caused by size of interconnects that are in the nanometer range may need iterations on the solutions and add to the runtimes of solvers. Alternative methods with simplified models of the ILD (interlayer dielectric) have been reported. As examples of such methods one example assumes simplified boundary conditions of the system; in another example the heat conduction paths are modeled with equation based equivalent thermal conductivity. In cases where a simplified conductivity model is used for the ILDs the mesh based solver run times will continue to grow by the large number of mesh points whether the solver works on a per layer basis or over the entire chip thereby making it impossible to obtain a scalable solution.

Accordingly, there exists a need for improved method and apparatus for determining thermal values for interconnects, and particularly for large numbers of interconnects within chips and/or between chips that function together in a unit or package to provide improved IC design.

BRIEF DESCRIPTION OF THE DRAWINGS

The embodiments will be more readily understood in view of the following description when accompanied by the below figures and wherein like reference numerals represent like elements, wherein:

FIG. 13 is an example of mutual heating data according to one example set forth in the disclosure;

DETAILED DESCRIPTION OF THE PREFERRED EMBODIMENTS

Figure 1:
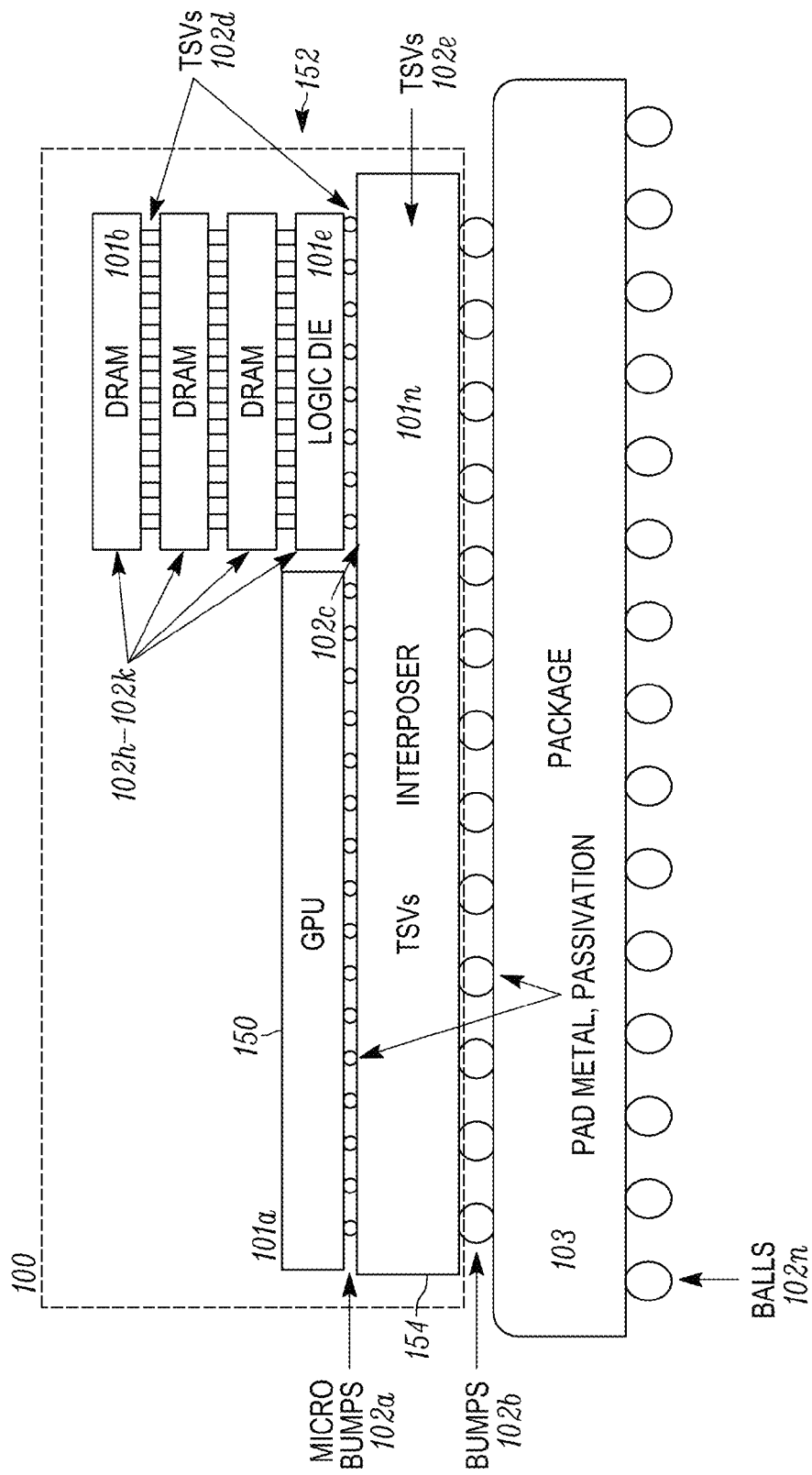
FIG. 1 is a block diagram illustrating one example of a stacked die assembly.

Temperature adversely affects semiconductor chip interconnect life time expectancy due to reliability failures. Chip manufacturers specify allowed operational limits for interconnect temperatures, electrical currents and power in computer readable form. Conventional methods of temperature estimation of interconnects are prohibitively time consuming as runtime increases non-linearly with number of interconnects making analysis of full scale system-on-chips or stacked die impractical. The disclosure describes a novel method and apparatus to partition large designs into a database of thermally related partitions that can be computed efficiently and simultaneously and the results then integrated using superposition for the full chips. Without such partitioning that include related interconnects in the same partition, accurate temperature estimation of large scale designs would not be possible.

The disclosed methods and system takes a database of representative topologies of interconnect segments and power data in accordance with manufacturer's specifications and generates one or more databases of functions and tables that characterize self heating of a single segments and mutual heating between segments respectively. Mutual heating of a segment A by another segment B is dependent on temperature of B being higher than A and the distance between A and B is such that a fraction of B's temperature contributes to A's. Said tables define the said fraction based on the distance of between A and B so that temperature contributions of B to A can be determined.

The functions (e.g., temperature estimation formulas) and tables are then applied on a full design database whereby interconnect topologies within the design database are matched with members of the representative topology database either exactly or by using interpolation such that appropriate functions and tables can be used to calculate temperatures of the interconnect topologies within the design database by combining the self heat of any segment and all of the mutual heat from neighboring metal segments.

Thermal regions are formed by identifying interconnect segments with temperature greater than a predetermined threshold $\tau$ and searching for its thermal aggressors. $\tau$ is directly determined from reliability rules (such as electromigration rules) stated by manufacturers. The foregoing procedure results in one or more databases of thermal regions per interconnect layer. Thermal regions are identified with labels and set of (x,y) coordinates of the region boundaries and the interconnect layer id and stored in the computer database(s).

The thermal region databases are input to a thermal partition generator that generates thermal partitions from one or more thermal regions. Partitions are computed from coordinates and layer-id of intersecting thermal regions and by taking the union of the intersecting regions. Partitions are first formed by combining regions on the same layer and then regions in adjacent interconnect layers and one or more databases of thermal partitions.

Stated another way, a design automation system performs thermal analysis of numerous interconnects within large scale semiconductors chips and package designs, where variations in interconnect shapes, sizes, topology and number prohibit consistent and complete thermal analysis. The system employs methods that can scale in performance and capacity and be applied to interconnects independent of their location within a semiconductor chip, package, between chips or between chips and package; furthermore the system can be used to modify existing design flows to improve analysis functions for chip-package interconnect analysis of SOC and 3D stacked semiconductor chip designs.

To enable such a system, high-performance models that can perform orders of magnitude faster than thermal field solvers, accurate within predetermined bounds are disclosed. The models are used in rapid estimation of potentially thermally compromised interconnect regions in semiconductor chips and packages. Application of such models to full scale designs take advantage of parallel processing of these regions with significant reduction in compute time by a workstation or other system. Thus by deploying fast methods that are within a predicted range of accuracy and tailored to account for characteristics of heat sources and heat transport paths the analysis performance and capacity can be scaled by adjusting the model parameters and in either eliminating the need for time-consuming simulation or reducing its application by identifying regions that fail any safeness criteria and therefore need accurate validation. The models read communicate optionally with an adaptive grid-based thermal field solver to maintain consistency of results thereby eliminating non-convergence issues and preventing unproductive design iterations.

A novel power estimation based on the thermal time constants of different heat sources is described. The method provides consistency across spatial and temporal domains between chips to avoid unrealistic power values as input to thermal analysis. Since temperatures are caused by diffusion of heat energy that can cross boundaries between the chip and package domains power dissipation in the devices and in interconnects in one domain can affect the temperatures of another domain. Hence the power estimation techniques need to be thermally aware in order to provide improved accuracy compared with methods practiced in the context of electrical applications.

Among other advantages, novel methods and apparatus for analysis of stacked chip-package interconnect structures is scalable in terms of capacity, performance and accuracy-performance tradeoff consistent with detailed sign-off quality analysis methods. System on Chip assemblies and 3D stacked chip structures can be improved through enhanced interconnection structures based on a chip partitioning scheme. The method enables life-cycle prediction and design quality evaluation for complex semiconductor product designs. Other advantages will be recognized by those of ordinary skill in the art.

In first variation parameterized high-performance models orders of magnitude faster than commercial thermal solvers are developed such that model parameters may be adjusted to fit the results from any mesh based thermal solver to: (a) derive equivalent conductivity of a stack of thermal material less or equal in number than those in the design; (b) derive temperature distribution due to the self heating of an interconnect; (c) contribution in terms of normalized ratios, percentages or absolute magnitudes, of aggressor to its victims which optionally can be restricted to be within specified distances from the aggressor; (d) as in item (c) but not restricted to victim locations but at arbitrary distances from the aggressor including location within the perimeters and or volume of the aggressor heating source; (e) derive aggressor and/or victim interconnect temperature distributions taking as input any combination of parameters that affect temperatures distribution of interconnects such that model outputs are convergent with any mesh based thermal solver, obviating inconsistent results with potential for missing design violations and/or spending resources on false errors; that the run times are sufficiently small to allow full scale analysis of complex designs; that the capacity enables full scale analysis of the entire system; that the simplified analysis does not misguide the users of the method into false conclusions on the goodness of their design; that the margin of approximation error be bounded to avoid excessive false error reports compared to accurate determination of the interconnect temperature as with commercially available solvers. It is not obvious from available prior art how these factors can be taken into account to construct a scalable thermal analysis for interconnects.

In a second variation the models are used to rapidly identify partitions within semiconductor chips, packages and chip-package interconnect structures where interconnect temperature distributions violate design and or manufacturing constraints. These partitions are then analyzed simultaneously in multiple computing resources (e.g., in multiple workstations) in an order independent manner, thereby enabling a scalability of the thermal analysis method. The models being applicable to semiconductor chips, packages and chip-package interconnect structures implements a unified methodology across the components of semiconductor products.

In a third variation the models are used in existing and/or augmented design automation systems to analyze and repair semiconductor designs from thermally induced performance and reliability issues.

Figure 2:
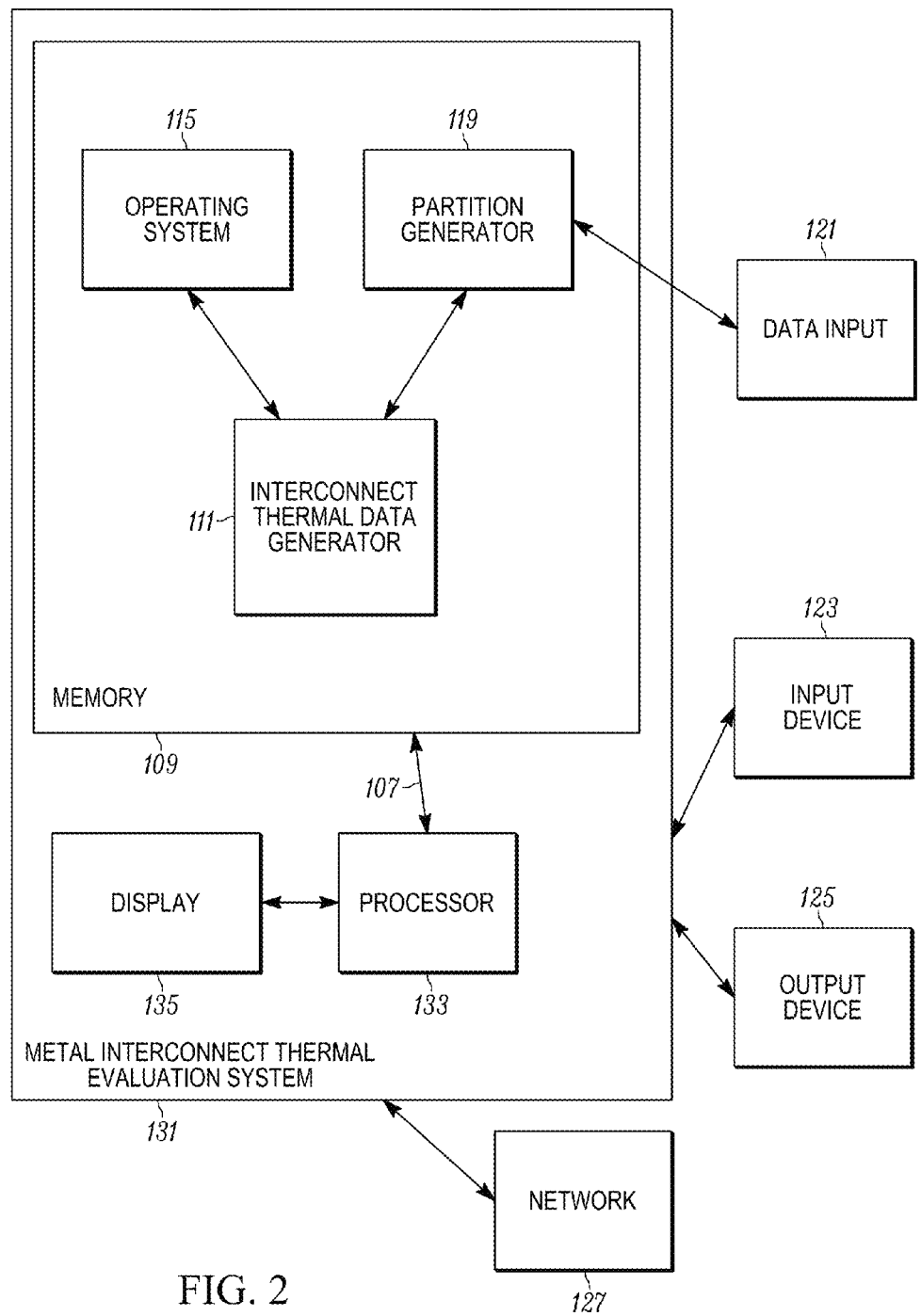
FIG. 2 is a block diagram illustrating one example of a system for determining interconnect temperatures according to an embodiment of the present disclosure.

FIG. 2 is a block diagram illustrating one example of a system (e.g., apparatus) for calculating temperatures according to an embodiment of the present disclosure. In FIG. 2, a metal interconnect thermal evaluation system 131, such as but not limited to a workstation or other suitable computing system, includes a processor 133, a display 135 or other output device, and memory 109. Additional structures may also be present. The thermal evaluation system 131 may be in communication with one or more input devices 123, one or more output devices 125, and one or more networks 127. In embodiments, other inputs and outputs may also be provided. The memory 109 includes executable code such as one or more operating systems 115, and a partition calculator 119, and a thermal calculator 111 (see 300 and 306 of FIG. 3). Additional software code may also be found in the memory 109. The thermal evaluation system 131 receives inputs and performs evaluations on the inputs to create one or more outputs. The one or more outputs may, in an embodiment, be transmitted to another system, or may be displayed, stored, or further analyzed by the thermal evaluation system 131.

The thermal evaluation system 131 may be a computing system or other hardware that includes logic, such as logic that includes, but is not limited to, one or more processors 135, suitable memory 109, suitable communication interfaces as known in the art, and one or more input 123 and output 125 devices, such as a display 105, as known in the art. In an embodiment, the thermal evaluation system 131 includes additional circuitry or other hardware to provide access to one or more networks 127, such as, for example, the Internet. In an embodiment, the thermal evaluation system 131 includes one or more processors 133 that are operable to execute instructions, retrieve locations in the memory 109 via, for example, bus 107, and write locations to the memory 109. The processor 133 may access the memory 109 via one or more busses 107. In an embodiment, the memory 109 includes, but is not limited to, hard disk drives, flash memory, random-access memory, or other data storage and recall devices. The thermal evaluation system 131 may also be associated with additional elements, such as an operating system 115, a speaker, a microphone, an antenna, a display, and an input device. The input device 123 may be, for example and without limitation, a keyboard and/or touch screen. The thermal evaluation system 131 may include more than one input device 123, or may be capable of input from one or more input devices 123. The devices and images described herein may be implemented as executing software programs that may be stored on a computer readable storage medium such as but not limited to CDROM, RAM, ROM, other forms of ROM, hard drives, distributed memory, etc., in combination with processors. As such, software programs may be stored on computer readable storage medium. The computer readable storage medium stores instructions executable by one or more processors that causes the one or more processors to perform operations described herein. The operating system 115 may communicate with the thermal calculator 111 and/or the partition calculator 119.

The network 127 may include one or more of: a local area network, a wide area network, a radio network such as a radio network using an IEEE 802.11x communications protocol, a cable network, a fiber network or other optical network, a token ring network, or any other kind of packet-switched network may be used. The network 127 may include the Internet, or may include any other type of public or private network. The use of the term "network" does not limit the network to a single style or type of network, or imply that one network is used. A combination of networks of any communications protocol or type may be used. For example, two or more packet-switched networks may be used, or a packet-switched network may be in communication with a radio network.

The data input 121 may include data regarding interconnects, packaging, die parameters, or other chip or package parameters, and allows the thermal evaluation system to calculate partitions and thermal data for the parameters of the chipset or package under analysis.

The data input 121 may also include a selected set of representative interconnect structures that are required by chip, package and chip stacking manufacturers to be qualified for reliability limits. These are dependent on technologies and design requirements. Users input these in standard format and specify physical dimensions, locations, material, shape, and power values; Computer readable data containing interconnect physical information, power values, techfile, user defined spatial, error and temperature bounds ($\omega, \epsilon, \tau$) may be provided as the data input 121. The error bounds are collectively expressed with symbols as shown but may have different values based on the usage context. The data input 121 may be in any suitable format including a database format.

Figure 3:
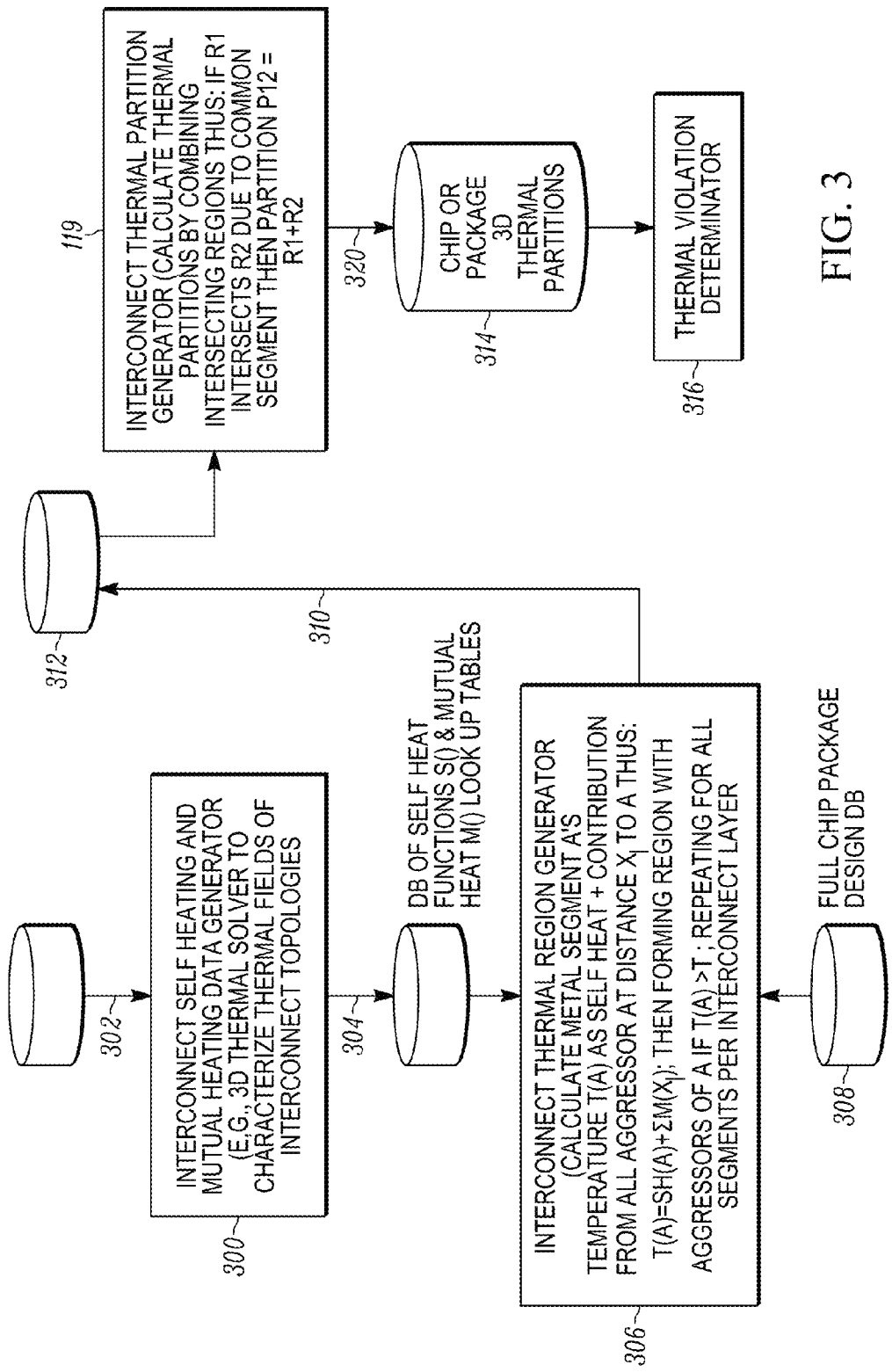
FIG. 3 is a block diagram illustrating one example of a system for determining interconnect temperatures according to an embodiment of the present disclosure.
Figure 9:
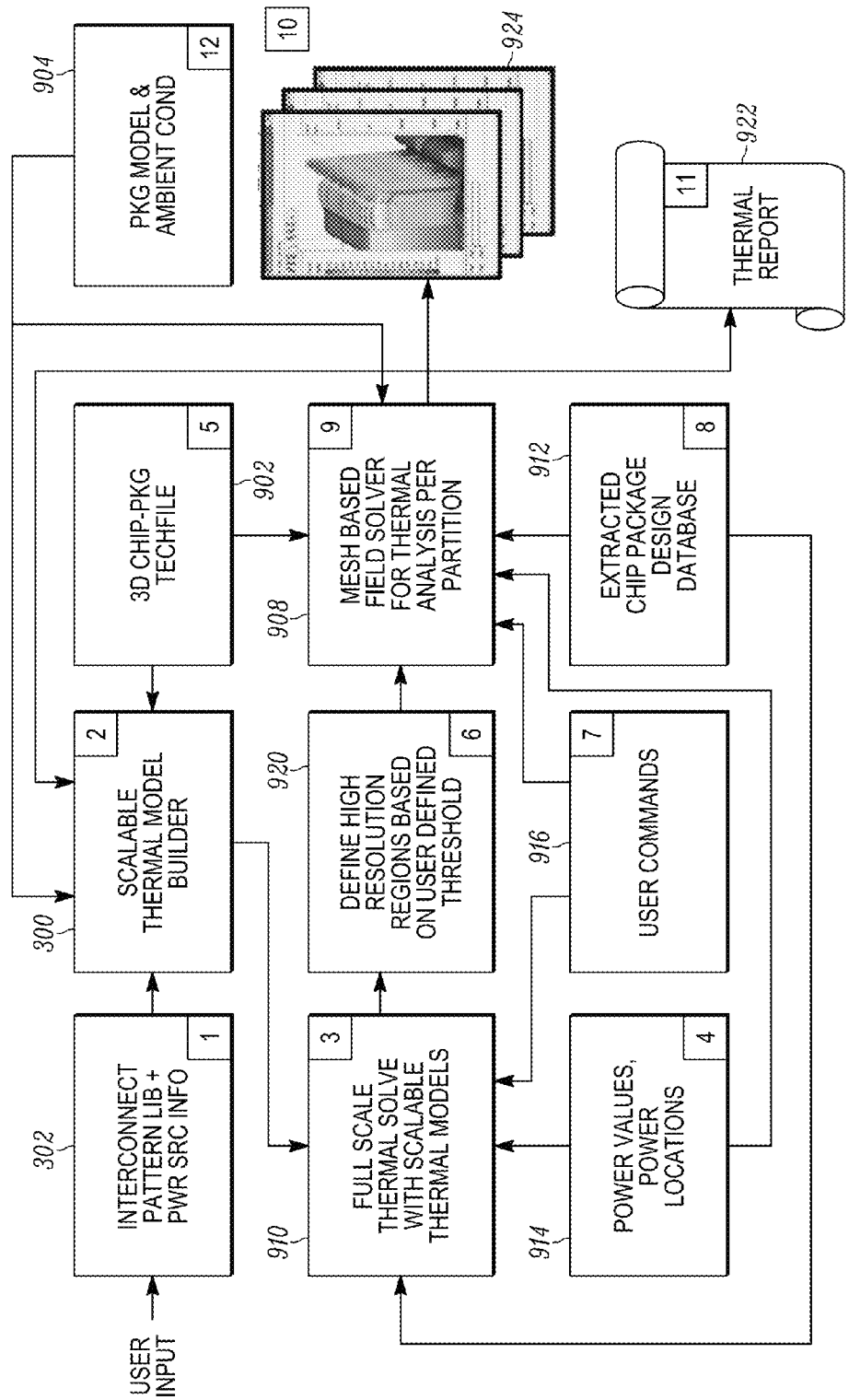
FIG. 9 is a block diagram illustrating one example of a metal interconnect evaluation system according to an embodiment of the present disclosure.

Referring also to FIGS. 3 and 9, an interconnect self heating and mutual heating generator 300 (also referred to as a scalable thermal model builder) may also be provided or included within the interconnect thermal data generator. Interconnect data 302 for the chipset may be provided to the scalable thermal model builder 300 with the addition of virtual temperature probes placed in the surrounding regions where the temperature values can be monitored; further input from a technology file 902 with details on arrangement of material stacks within the semiconductor chips and packages; thermal properties of the materials used, such as conductivity and associate temperature and/or geometry dependent variations may also be provided. Arrangement of material stack descriptions include but is not limited to: dimensions of the stack in terms of length, width and height and/or radius, slopes, orientation, relative positions of the stack with each other; dimension of the semiconductor chip; material composition within the material layers of often referred to as mask materials and their geometry; and chip-package interconnect and thermal management data. The materials and the mask and the dimensions are referred to as techfile, and they are mostly defined in one or more technology related databases. The interconnect data 302 may include data from a database that includes representative interconnect topologies, power, material thermal conductivity, electro migration rules in accordance with manufacturer specifications.

Another input for the scalable thermal model may include a package model 904, and ambient information such as temperature and actual operational conditions. These may include convection cooling and any thermal management schemes that collectively provide the boundary conditions of the semiconductor and package design.

The interconnect thermal modeling in this example is based on linear systems theory in which a steady state response at a given point due to the heat source is modeled based on the simulation of the interconnect heat source with a mesh based field solver. The model is chosen to fit the constraints which, for example, are chosen to be within a specified accuracy which is to hold over a specified neighborhood region of the heat source. Those skilled in the art will appreciate that the mesh configuration resulting from thermal solvers are analogous to electrical networks. Analogously the response to an active source such as a heat source at any given part of the network can be modeled with transfer functions that provide input-output relationships between the excitation temperature value and the temperature response. For example, the case of steady state case temperatures distributed across thermal resistor network may be modeled with polynomial functions with distance as the variable, with model parameters determined as functions of b, c, d, k values in. For example the temperature at a point T(x,y) can be expressed as:

$$T(x, y) = \frac{po + \sum_{i=1}^{m} p_i r^i}{qo + \sum_{j=1}^{n} q_j r^j} T_{source}, \quad r = \sqrt{x^2 + y^2} \quad (3)$$

Where p's and q's are model parameters and in this example are functions of the interconnect dimensions, the techfile layer dimensions and conductivity of the thermal materials in each layer. $T_{source}$ is peak average temperature of the heat source. The values of p and q parameters are fitted to meet the accuracy criteria. Adequate probe points (as many as the max number of unknown coefficient in the polynomials) are used for formulating a system of linear equations which are solved using matrix algebra and/or combined with partial fraction expansion to determine the values of p's and q's. The degrees of the polynomials are dependent on the criteria and the performance of computation of (3) will consequently depend on the complexity of the model. The model computation times can be scaled through accuracy and performance trade-off.

The first operation is to determine a technology stack configuration which is derived from the original techfile and design that can be used for determining the thermal models for interconnects in any particular layer of the design. The derived 3D equivalent shows that a metal interconnect placed on top of two material layers with equivalent thermal conductivities kL and kV. The equivalent layer representation is not limited to this example and may have more than two layers each with or without mask material to approximate the surrounding environment context of interconnects in the design. The operation to obtain equivalent thermal conductivity are further explained by FIG. 8.

Figure 8:
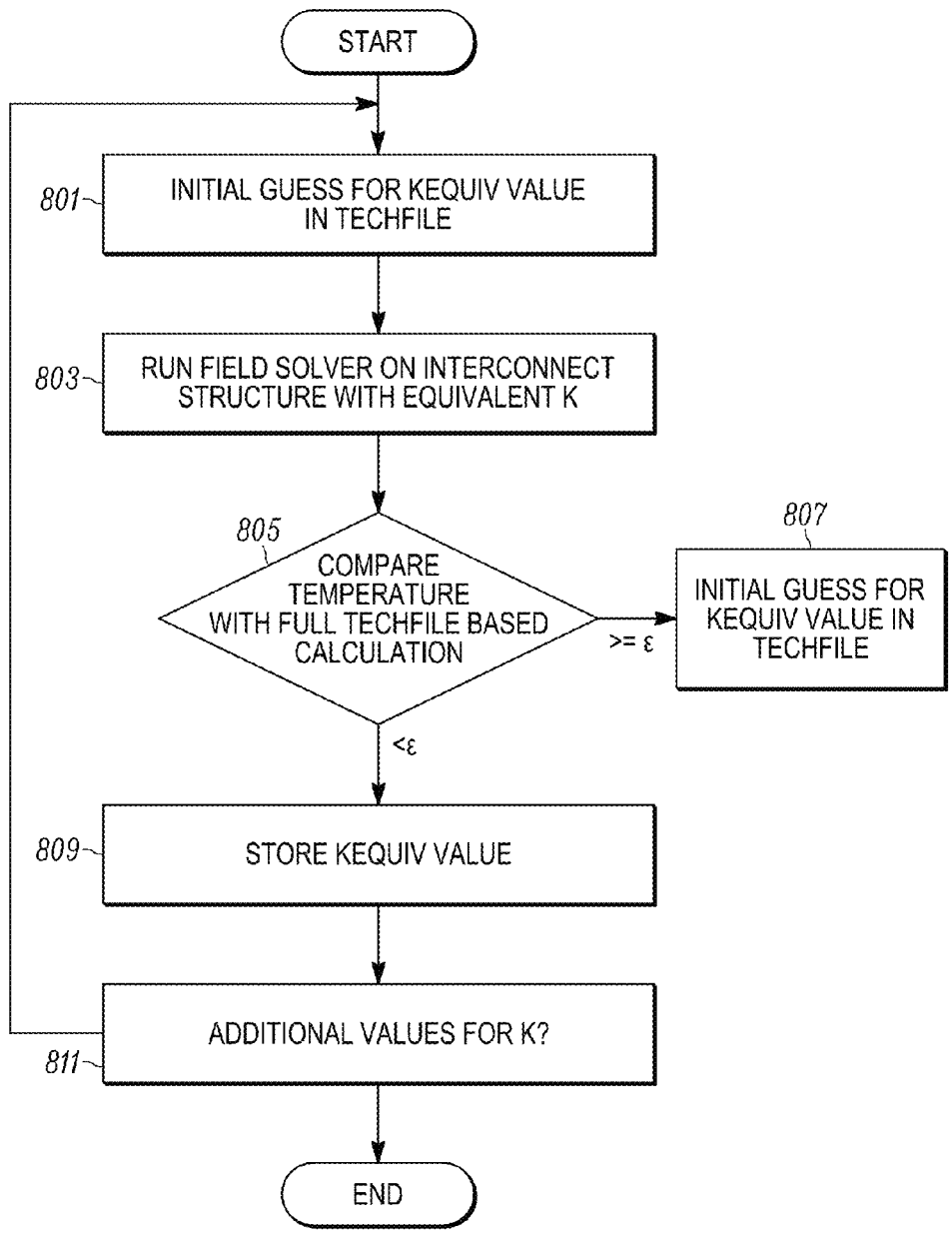
FIG. 8 is a flowchart illustrating an example of finding thermal equivalent values according to an embodiment of the present disclosure.

As shown in block 801 of FIG. 8, an initial guess for the conductivity value is made based on any or a combination of averaging, weighted averaging, analytical methods or numerical methods; in the example a weighted average is taken on the ILD and the metal layers based on the techfile. Shown in block 803, the ΔTs of the interconnect structures are calculated using a thermal solver with representative design material stacks and compared, in block 805, with the ΔTs from the thermal solver with equivalent material stacks. If the difference is larger than specified tolerance values c then a next guess value is selected based on numerical methods such as bi-section or secant search optionally with interpolation used as in Newton-Raphson or Brent method, shown in block 807. If the difference is smaller than the specified tolerance value ∈, the value is stored, shown in block 809. The process is continued, shown in block 811, until the resulting ΔTs are within acceptable bounds. The equivalent conductivity is used to derive the analytical models parameters. Physical SPEF is an industry standard format for exchanging parasitic data between computer programs and contains the symbolic name of each instance (id), its physical coordinates and layer information so that the location and the dimensions of the power sources (p_loc) can be extracted for thermal analysis and written out. The power values (pwr_vals) are defined with symbolic instance names thereby creating data for a database where the individual p_locs and pwr_vals can be cross referenced and used as input to thermal solvers and the analytical model builder.

The thermal solver is used to calculate the temperature gradients ΔT of the interconnect using the equivalent conductivity values and the representative stacks and interconnect. The temperatures ΔTs at inserted probes are used to solve the parameters of the analytical model, after a first guess at the order of the polynomials. The analytical model is then used for calculating ΔTs at the probes. The analytical model results are compared with those of the thermal solver for the error bound c and the spatial bound ω. If the errors are out of bounds then the analytical model parameters are adjusted with more probe measurements and more parameters, and/or different model forms, and the process continued for a fixed number of times that is within practical constraints of time allowed for model development. If errors are within the specified bounds the model parameters would be stored in association with the interconnect model. The temperatures at the probes are calculated using a mesh based thermal solver and plotted in a graph, where the y axis represents temperature and the x axis the distance from the center of the wire or interconnect. A similar approach is applied for deriving analytical models for the self heating of interconnects and an example model for interconnects of the type may have its temperature at the center given by the expression:

$$T_{SH} = q_1 \ln\frac{b}{c} + q_2 \quad (4)$$

where q's are constants dependent on the power density of the interconnect, other constants and material properties, including effects of other surrounding interconnects. Here, standard methods are used to solve for the coefficients to fit the results of thermal solver based computations. The analytical models are orders of magnitude faster than thermal solvers that are used for fine-grain interconnect analysis.

The output from the scalable thermal model builder 300 is a set of model parameters with associated thermal models for a corresponding set of interconnects.

The partition generator 119 in the interconnect thermal data generator 111 as shown in one example may be the processor 133 executing stored instructions that are in memory that when executed cause the processor 133 to function as the interconnect thermal data generator 111 and the partition generator 119 and also executes the operating system 115. Similarly, the interconnect self heating and mutual heating data generator 300, the interconnect thermal region generator and the interconnect thermal partition generator are, in this example, implemented as the processor 133 executing executable code wherein the executable code may be stored in memory 109. The output from the scalable thermal model builder 300 as shown in this example is self heat data (for example, Δt) as well as mutual heat data that may be in the form of, for example, a lookup table (see e.g., FIG. 13).

Figure 12:
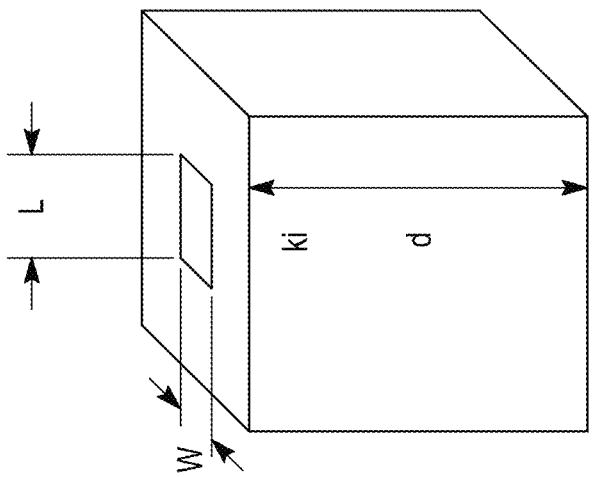
FIG. 12 is a diagram illustrating model information used according to one example set forth in the disclosure.

FIG. 12 illustrates one example of the self heat function that generates the Δt or thermal value due to the self heat function. Accordingly, the memory and in this example is shown as database that includes per-interconnect self heating data (the Δt value is for interconnects) and mutual heating data 304 stored in the database. The interconnect self heating and mutual heating data generator 300 performs the calculation shown, for example, in FIG. 12 and also the resulting table in FIG. 13 apriori. This information is based on the information noted above which may include the representative interconnect topologies, power information, material thermal conductivity, and electro migration rules in accordance with manufacturers specifications. Generating this apriori database based on the power information for both self heat and mutual heat information allows for a rapid generation of the thermal partitions.

As illustrated in FIG. 3, the interconnect thermal region generator 306 forms regions as set forth above takes into account self heat temperature values and contribution from all aggressors at a distance x. The chip package design database 308 provides the actual interconnect information being used in a chip being evaluated. The multiple thermal region data 310 is then stored, for example, in database 312. It will be recognized that the database as shown may be a single database, multiple databases or any other suitable storage mechanism. As indicated, the database of thermal regions R_j utilizes coordinates that define the geometrical boundaries and layer identification information. Each region is tagged with a unique label. The multiple regions are then used by the interconnect thermal partition generator 119 to generate one or more thermal interconnect thermal partitions. This is done by combining intersecting regions to form a partition. Each partition, for example, may include a set of thermally related interconnect segments and their respective temperature values, segment material information and those of dielectrics, boundary conditions of a partition including temperature and power information per segment. The thermal partitions include the metal interconnect that are related to each other by thermal influence. The thermal partitions for an entire chip or package may be stored in memory as shown, for example, as database 314 including per interconnect thermal values and partition boundary information 320. The partitions are then passed to a mesh based field solver (see for example, FIG. 9)

to determine whether there are thermal violations in the thermal partitions. Therefore, a thermal violation determinator 316, as known in the art.

In one example of the analytical models they are used with non rectilinear-shaped interconnect power sources. Examples include shapes in a package interconnect structure, illustrating selected details of an embodiment that involves curved line geometry extending in three dimensions unlike those that are found within a semiconductor chip. FEA based thermal solvers from companies like Ansys inc., Mentor Grpahics are used for analysis of such shapes and in semi-spherical bump structures. The method of fast analysis model development uses results from FEA thermal solvers for shapes that do not conform to those within a semiconductor chip. In a variation of the application correction functions are developed between cuboid shaped volumes and elements of such interconnect structures to allow for analysis of chip and package structures with rectilinear mesh based thermal solvers. This method enables use of finite volume cuboid-based solvers to be used across both chip and package interconnect structures thereby allowing efficiency and uniformity.

Figure 11:
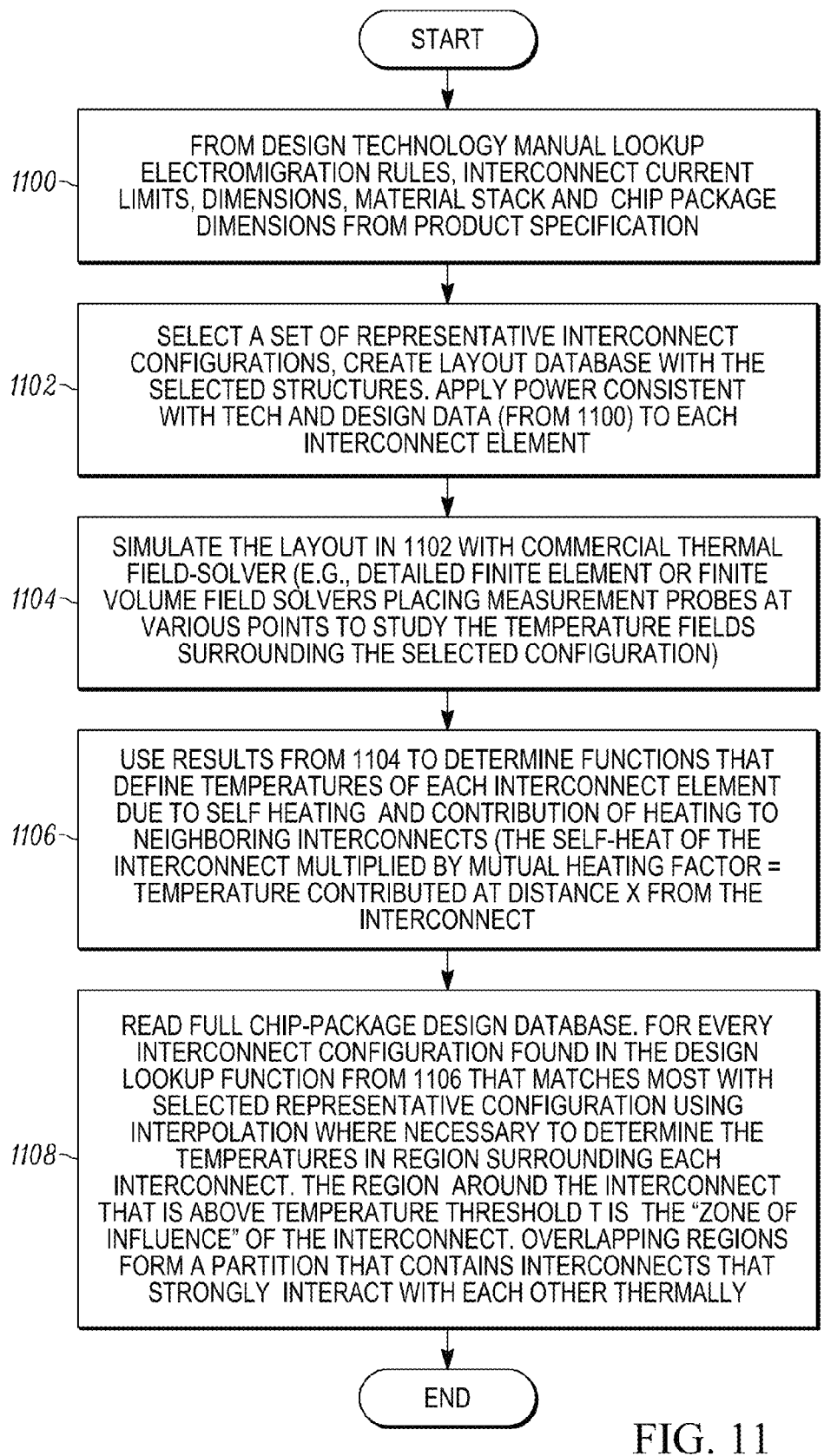
FIG. 11 is a flow chart illustrating one example of a method according to the disclosure.

Referring to FIGS. 9 and 11, a method for determining integrated circuit or package thermal values for metal interconnects includes producing the interconnect pattern library and power source information as shown in block 302 of FIG. 9 and as set forth in block 1100, for example, from design technology manual lookups, electro migration rules, interconnect current limits, dimensions, material stack and chip package dimensions from product specification data. The system receives a user selection of a set of representative interconnect configurations to create a layout database with the selected structures and to apply power consistent with the technology and design data to each interconnect element. As such, the output is the layout configurations of the interconnects.

The scalable thermal model builder 300 operates, for example, as shown in blocks 1104 and 1106. The mesh based field solver 908 produces thermal analysis per partition. As shown in block 1104, the scalable thermal model builder 300 assimilates the layout with commercial thermal field solver (such as that shown in block 908) by detailing finite element or finite volume field solvers by placing hypothetical measurement probes at various points to study the temperature fields surrounding the selected configuration. The scalable thermal model builder uses the results to determine functions that define temperatures of each interconnect element due to self heating and the contribution of heating to neighboring interconnects so that the self heat of the interconnect multiplied by the mutual heating factor, for example, equals the temperature contributed at a distance x from the interconnect as described above. The design technology data 902 also serves as input to the mesh based field solver 908.

In block 910, there is a full scale thermal solver with scalable thermal models which as shown in block 1108 can read the full chip package design database for every interconnect configuration found in the design lookup function that matches most with selected representative configurations using interpolation where necessary to determine the temperatures in the regions surrounding each interconnect. The reason allowing the interconnect as above if the temperature threshold T is the zone of influence of the interconnect. Overlapping regions form a partition that contains interconnects that strong interact with each other thermally. The full chip design database 912 serves as input as does power data from the power values and power location information 914 which may be also output from the scalable thermal model builder 300, which are used in defining thermal partitions. User commands 916 argues to navigate through the operation as desired. As shown in block 920, the system defines high resolution regions based on user defined thresholds for analysis by the mesh based field solver 908. Referring to FIG. 9, the apparatus may output thermal reports 922 or graphic user interfaces 924 for user evaluation to determine whether to, for example, reroute traces or change trace sizes or make other modifications to interconnects as desired.

Figure 10:
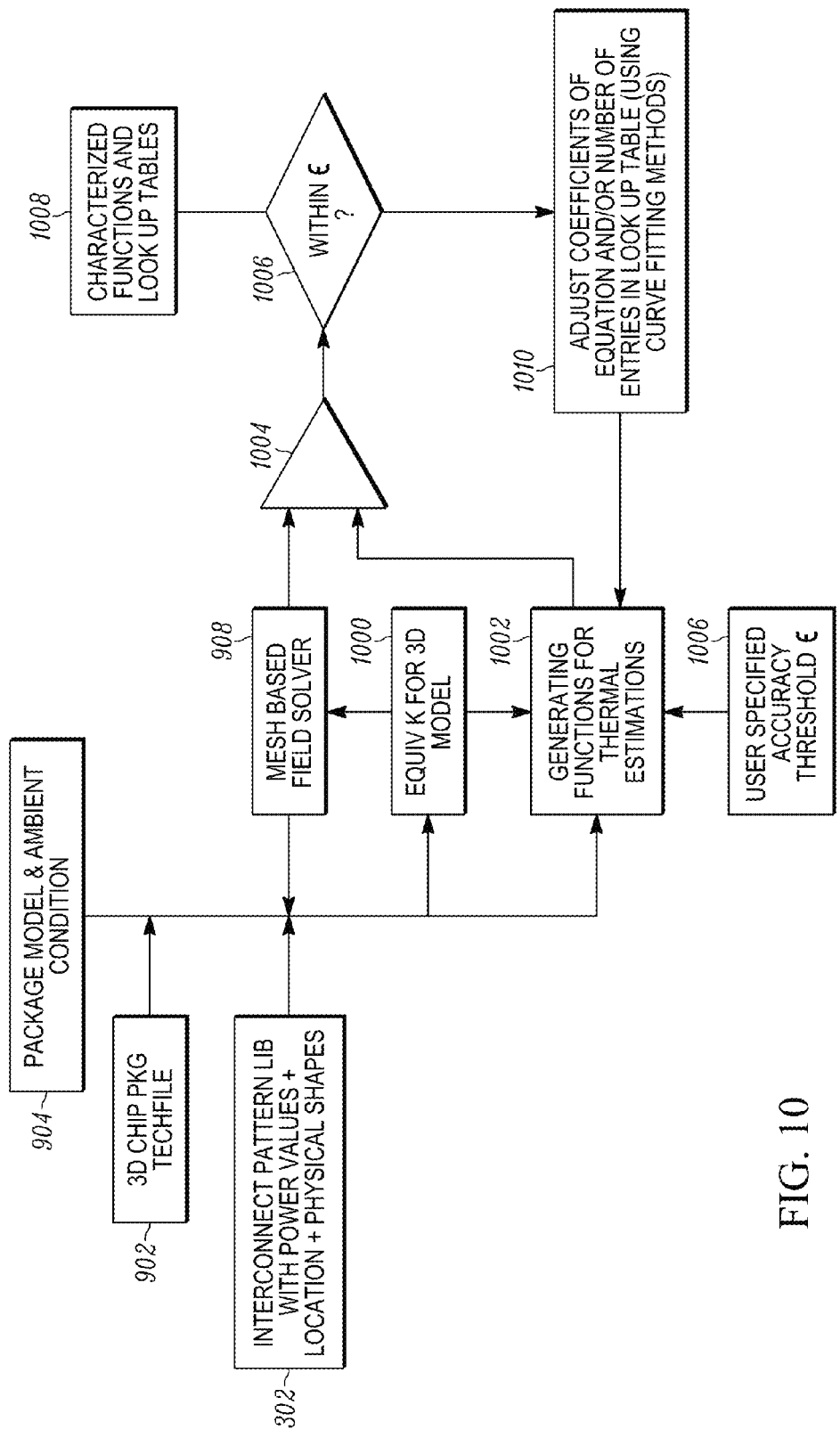
FIG. 10 is a flow chart illustrating one example of a method according to the disclosure.

FIG. 10 illustrates an example of the operation of the scalable thermal model builder shown in FIG. 9 to compute self and mutual heat functions. As shown, an equivalent K for a 3D model operation 1000 is used as input to the mesh based field solver 908 based on package model and ambient condition information 904 and other information as shown. Functions are generated for thermal estimations as shown in block 1002 from, for example, the thermal solver 910. The information is compared to that generated by the mesh based field solver 908 by comparator 1004 which may be, for example, part of the block 920. A user may specify the accuracy threshold of error as shown in block 1006 if desired. If the error is within the accuracy threshold as shown in block 1006, the functions and lookup tables (FIGS. 12 and 13) are characterized as shown in block 1008. Otherwise, the equations are adjusted or the number of entries in the lookup can be adjusted as shown in block 1010.

Figure 14:
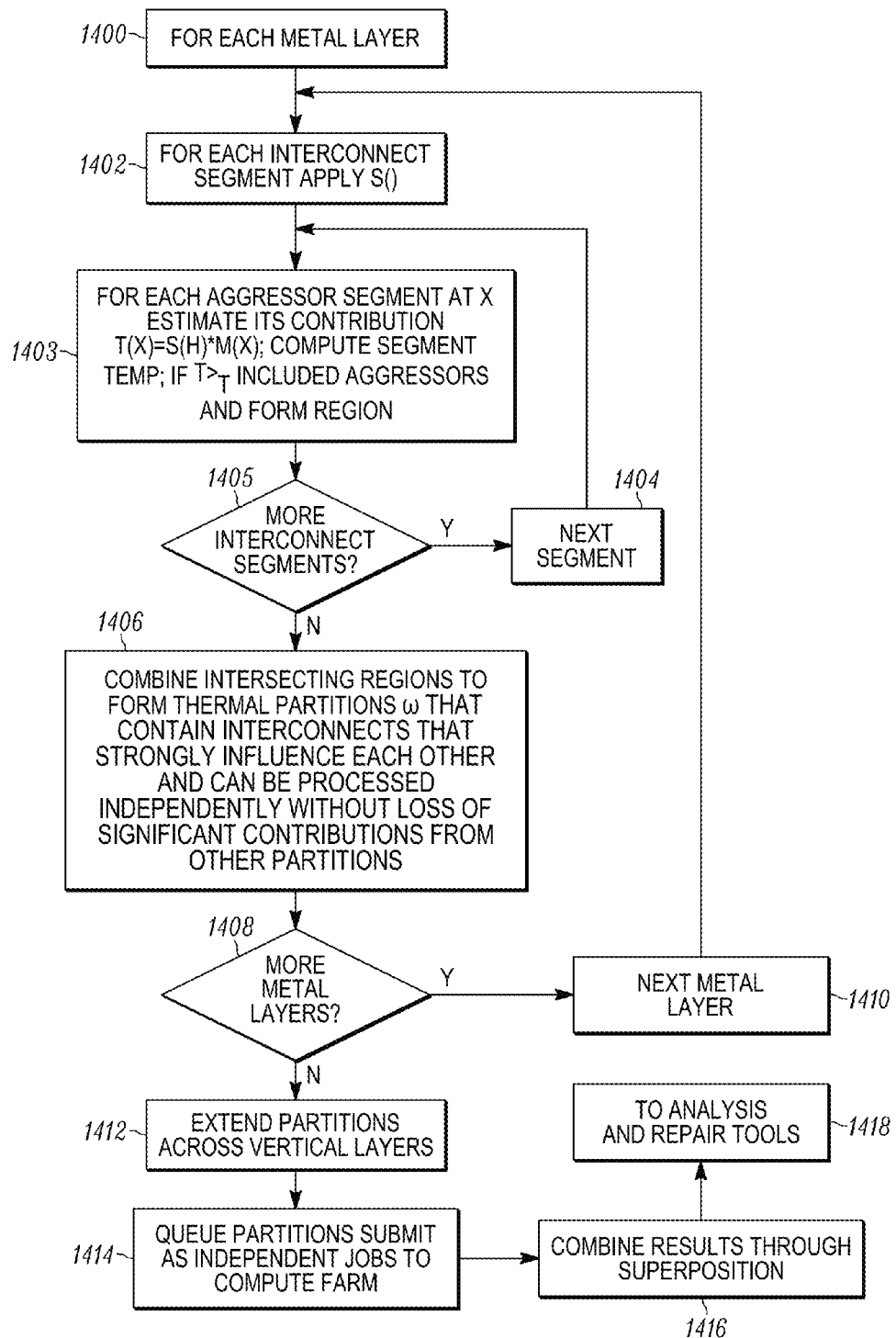
FIG. 14 is a flowchart illustrating a method for generating thermal partitions in accordance with one embodiment of the disclosure.

As shown in FIG. 14, a method for finding thermal partitions on full designs is set forth. As shown in block 1400, the method includes, for each metal layer and for each interconnect segment apply the function S( ) as also shown in block 1402. As shown in block 1403, the method includes for each aggressor segment at a distance X, estimating its contribution. As shown in block 1405, the method determines if more interconnect segments need to be evaluated. If so, the next segment is evaluated as shown in block 1404. If not, the method includes combining the intersecting regions from block 1403 to form thermal partitions that contain interconnects that strongly influence each other and can be processed independently without the loss of significant contributions from other partitions. This is shown in block 1406. As shown in block 1408, the method includes determining if there are more metal layers, if so, as shown in block 1410 the method includes evaluating the next metal layer. If not, the method includes extending the partitions across vertical layers as shown in block 1412. As shown in block 1414, the method includes queuing partitions and submit them as independent jobs to a compute farm such as a group of work stations or any other suitable structure. As shown in block 1416, the method includes combining the results through superposition and as shown in block 1418, the method includes sending the information to the analysis and repair tools to determine whether changes to interconnects location, sizing or other changes should be made.

Figure 15:
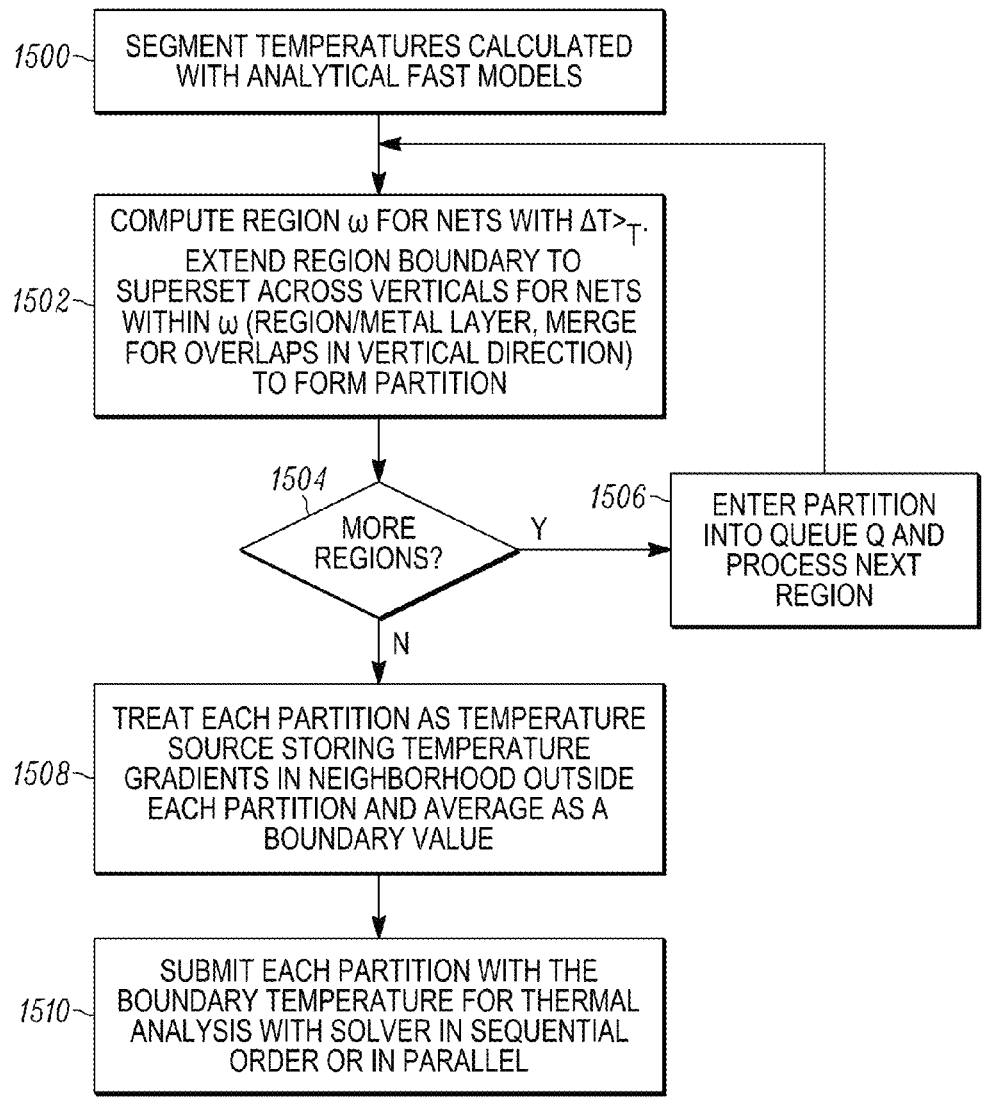
FIG. 15 is a flowchart illustrating one example of a method according to the disclosure.

FIG. 15 expands detail with respect to the method of blocks 914, 902, 920, 916, 912 and 908 (boxes 4-9 of FIG. 9) where regions are identified based on calculated temperature and threshold values; then extending regions based on overlap with other regions on top and on the sides. The method includes defining boundary conditions iteratively at partitions to enable order independent evaluation of the partitioned regions with sequential and/or parallel processing. As shown in block 1500, the method includes segmenting temperatures calculated with the analytical fast models. As shown in block 1502, the method includes computing the region for nets with changing temperature beyond some threshold and extending the region boundary to a superset across vertical for nets within the region to form a partition. As shown in block 1504, the method includes determining if more regions need to be evaluated and if so, as shown in block 1506, the method includes entering a partition into a queue and processing the next region. However, if no more regions need to be considered, as shown in block 1508, the method includes treating each partition as a temperature source and storing the temperature gradients in a neighborhood outside each partition and averaging temperature information as a boundary value. As shown in block 1510, the method includes submitting each partition with the boundary temperature for thermal analysis with the thermal solver in sequential order or in parallel if desired.

Figure 16:
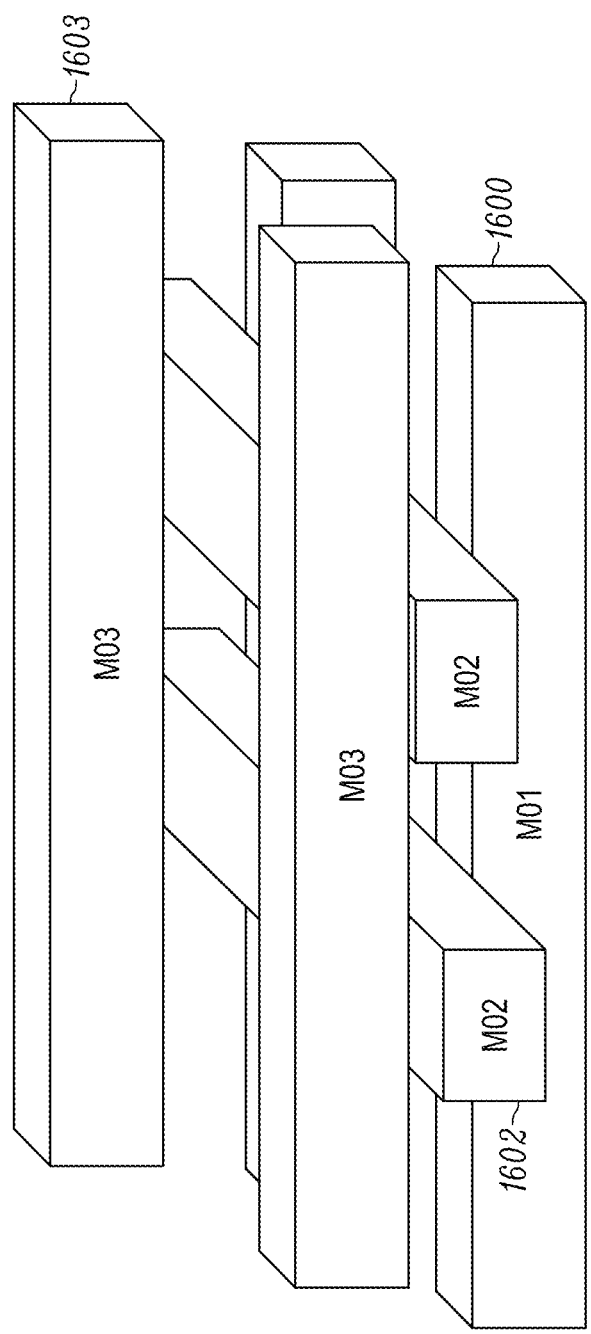
FIG. 16 is a diagram illustrating one example of interconnects.
Figure 17:
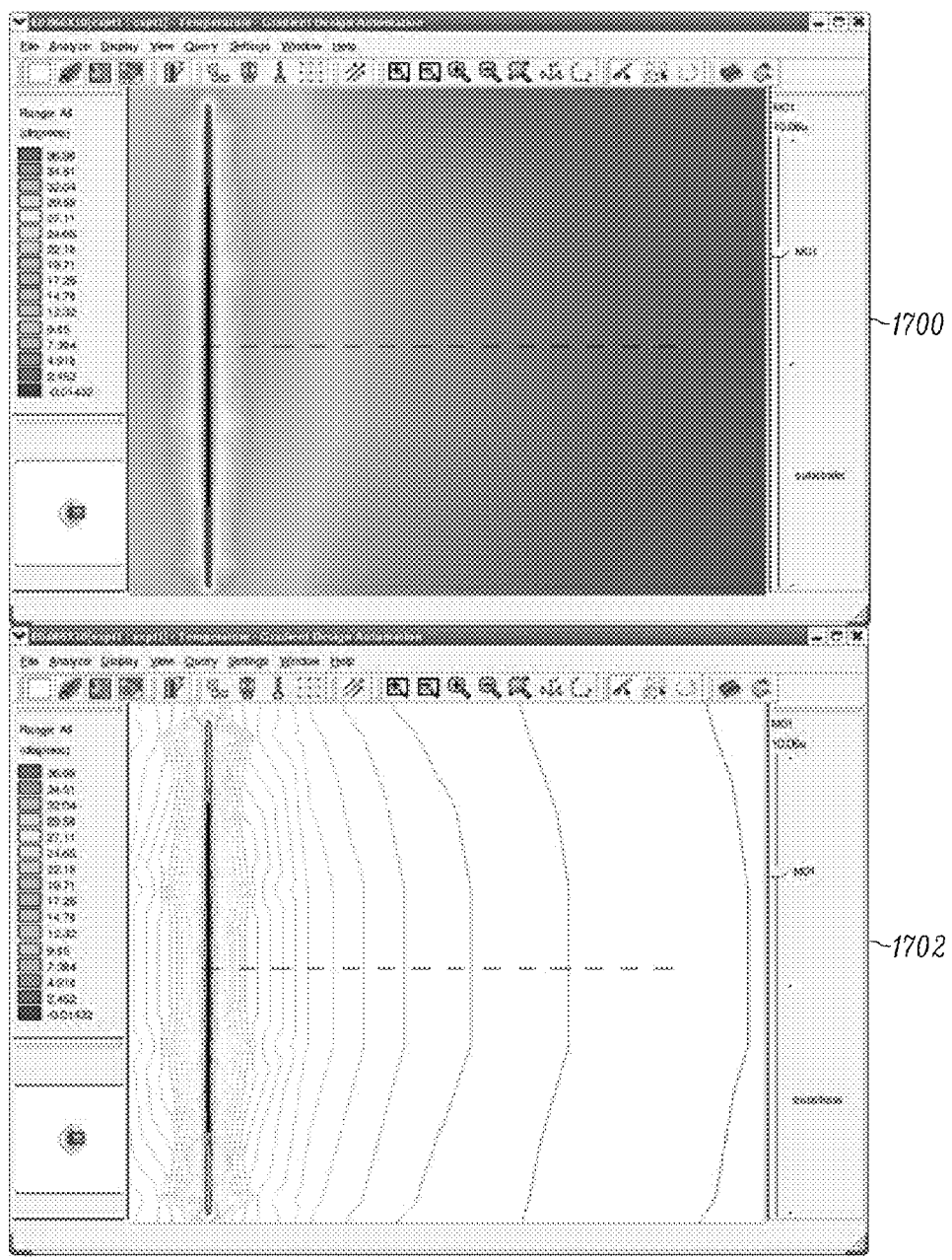
FIG. 17 shows examples showing virtual probe placement to determine simulated temperature values.

Referring to FIG. 16 and FIG. 17, layer 1 1600, layer 2 1602 and layer 3 1603 of metal interconnects for diagrammatical purposes are shown. FIG. 17 diagrammatically illustrates graphic user interface examples showing probe placements for characterization of interconnects. GUI 1700 represents an interconnect configuration consisting of a wire on metal layer 1602 (FIG. 16) of a length of 10 microns and a width of 0.066 microns with a power value of 5 microwatts. GUI 1702 shows an example of positions of simulated temperature probes placed using methods described with respect to FIG. 10. In this case, probes are in line at right angles to the interconnect (other probe positions not shown may spread in radial directions from the interconnect). The temperature values are simulated with a detailed field solver referenced in block 908 of FIG. 9. The simulated thermal field is shown on the graphic user interface with temperature contours appearing more frequently at the higher field values. The fields falling below temperature predetermined thresholds at a boundary of regions that form the thermal conditions are shown to be wire.

Figure 18:
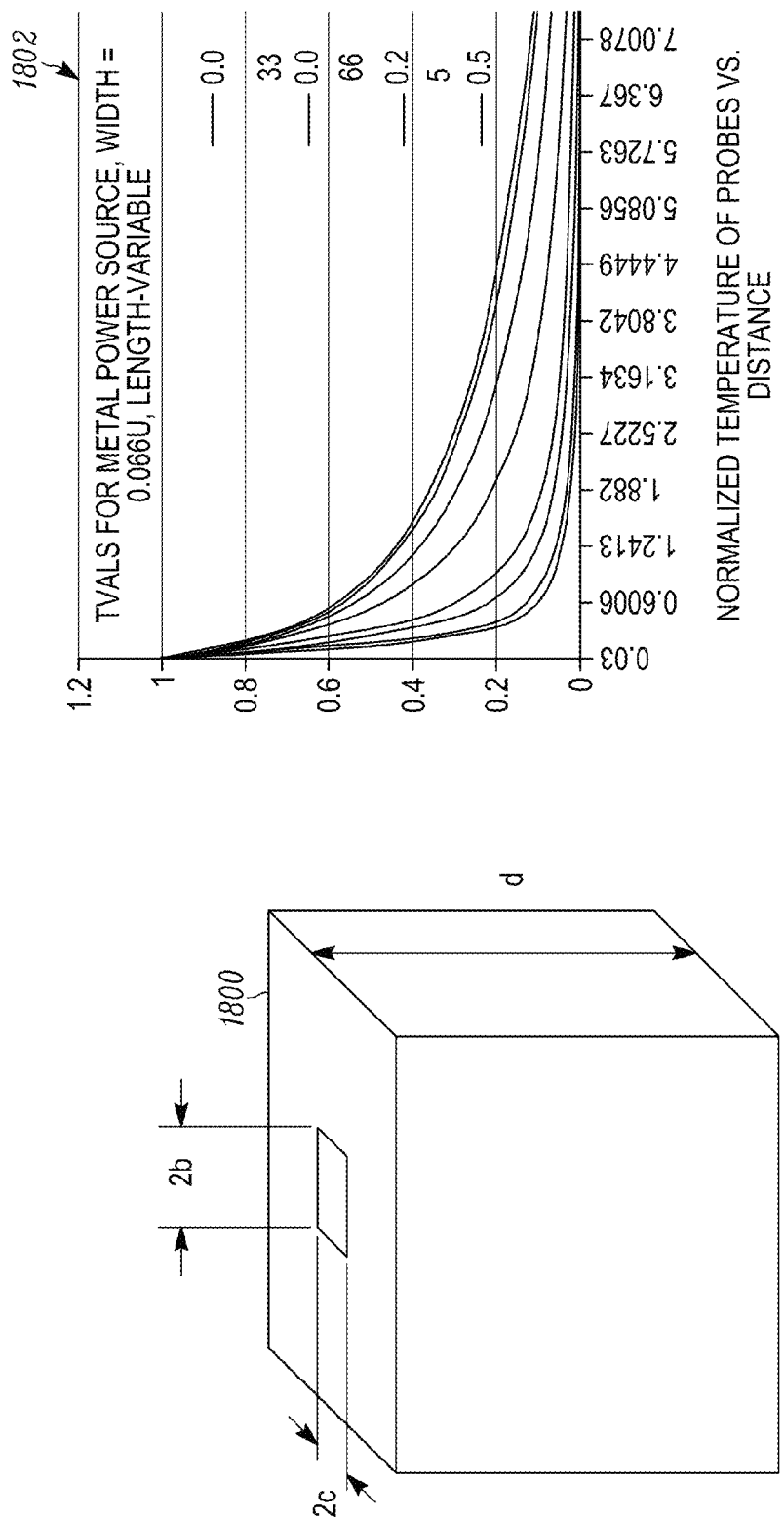
FIG. 18 shows examples showing virtual probe placement to determine simulated temperature values.

FIG. 18 diagrammatically illustrates, for example, how a zone of influence and temperature functions for a single wire may be constructed as shown, for example, in 1800. 1802 shows simulated normalized temperatures that probes for wires with length 0.066, 0.132, 0.5, 1, 4, 10, 16, 20, 30 and 40 microns respectively and width of 0.066 microns. The probes are placed at distances as shown on the x axis of 1802 which measure the contribution fraction of the temperature of the wire at a distance from the wire. Temperature estimation functions shown in FIG. 12 is multiplied by a table lookup from FIG. 13 to calculate the temperatures in the regions surrounding the wire and the regions where the temperature contribution is greater than a given threshold which is then considered the zone of influence of the wire.

Figure 19:
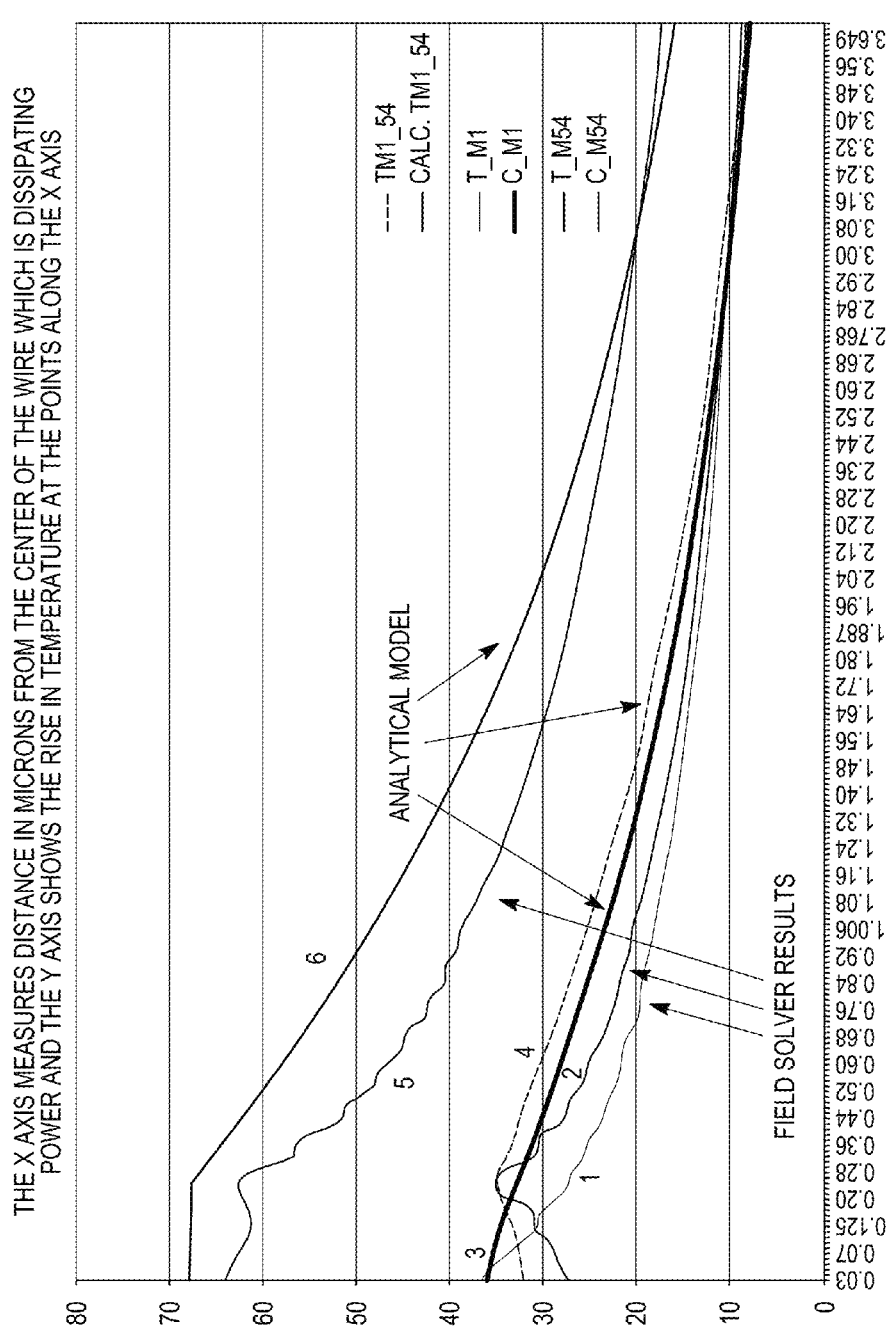
FIG. 19 illustrates superposed analytical vs. thermal solver temperature values.

FIG. 19 illustrates a superimposed analytical versus thermal solver temperature value chart where the x axis measures distance in microns from the center of the wire which is dissipating power and the y axis shows the rise in temperature at the points along the x axis.

Figure 20:
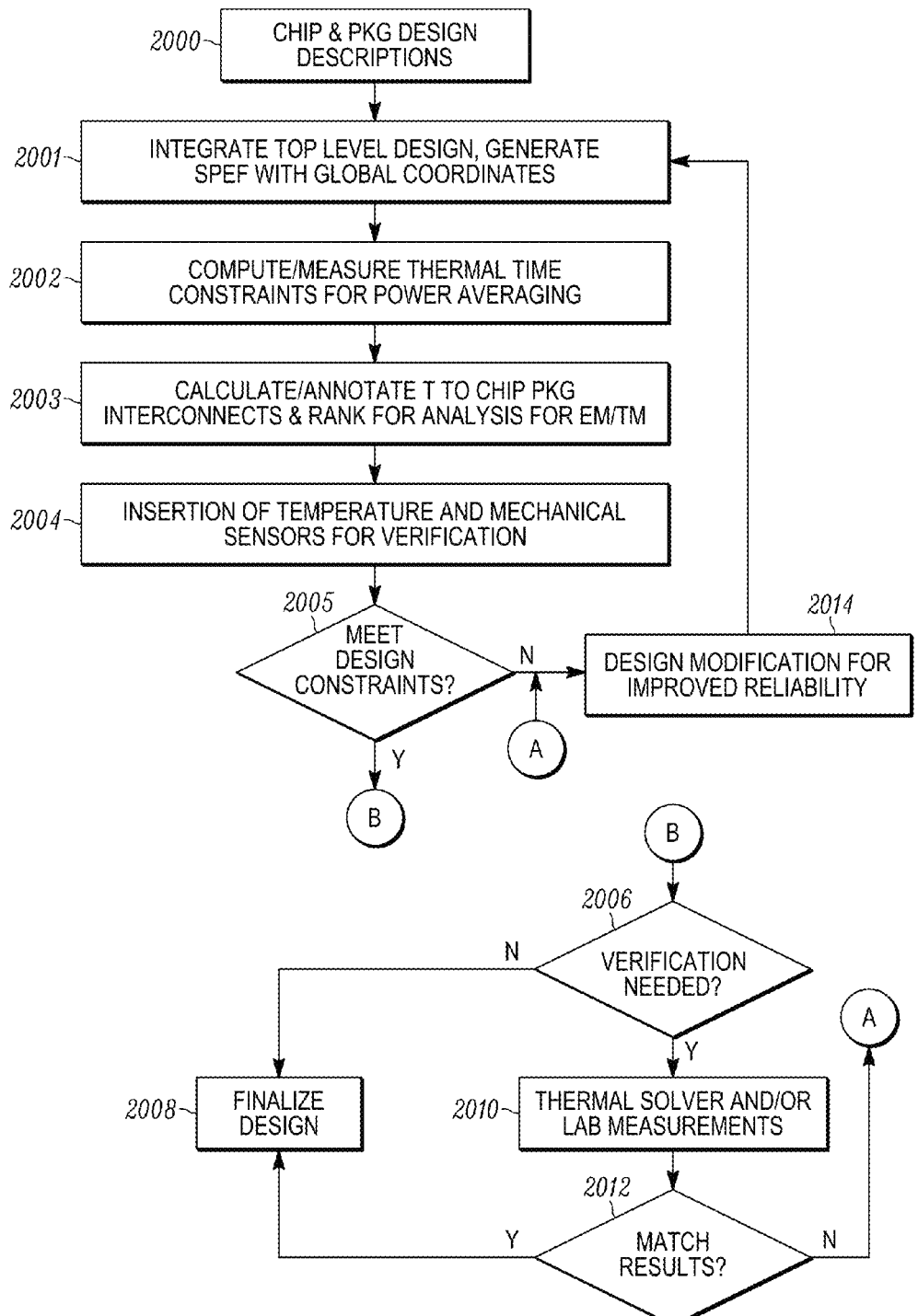
FIG. 20 is a flowchart illustrating analysis flow with fast thermal solver operation instead of or in conjunction with thermal solvers.

FIG. 20 illustrates an analysis flow with faster thermal solver instead of or in conjunction with a thermal solver. As shown in block 2000, chip and package design descriptions are used to integrate a top level design and generate an SPEF with global coordinates as shown in block 2001. The apparatus computes and measures the thermal time constants for power averaging as shown in block 2002 and calculates and annotates the T to chip package interconnects and ranks them for analysis as shown in block 2003. In block 2004, the method includes placing temperature and mechanical sensors on the integrated circuit or package for verification. As shown in block 2005, the method includes determining if the readings meet design constraints. If so, the process continues to block 2006 where it is determined if verification is needed. If not, then the design is finalized as shown in block 2008. However, if verification is needed, as shown in block 2010, the thermal solver and/or lab measurements are used to verify and as shown in block 2012, it is determined if results are matched. If so, the design is finalized. If not, then as shown in block 2014, the method includes modifying design for improved reliability by, for example, changing location of interconnects, sizes and other variables as known in the art.

The resulting models from the scalable thermal model builder are then used for full scale thermal analysis of semiconductor chips and packages. Chip design data and package data in standard format may be used with the scalable thermal model builder. The physical locations and dimensions of power sources are extracted using tools in the industry such as, for example and without limitation, StarRC from Synopsys Inc., HiPer PX from Tanner EDA, QRC from Cadence Design Systems Inc., xACT, Calibre from Mentor Graphics Inc. and Ansys Inc for package shapes and power values.

The use of the scalable thermal models employs the principle of superposition to calculate the temperature gradients in the semiconductor and package interconnect structures. Consider that several hot wires are surrounded by other wires which may or may not dissipate any power then the superposition principle states that the temperature contributions of aggressor wires on a victim wire is given by a linear sum of the contributions of each individual wire. Using a linear summation the temperature of a third wire can be derived from analytical model based evaluations of the two aggressors of the third (victim) wire. Linear superposition is provided as an example; other functions for combining the temperatures from aggressors may be used instead of linear methods. The scalable thermal model builder provides inputs for a full scale thermal solve with the scalable thermal models. The fast models are applied to calculate the normalized interconnect temperature gradient contribution pi for each aggressor, per layer. The temperature contribution toward a victim is independent of the order of aggressor evaluation. The results are stored per victim in data structures, where $V_j$ keeps list of its associated normalized contribution $p_i$. The normalized values are with respect to each aggressor's temperature due to self heat being set to unity. After accounting for aggressor contributions from lateral dimensions, vertical dimensions, or combination of lateral and vertical direction, the temperatures of the aggressors due to self heating is computed using analytical models such as the ones described in equation (4). The $\Delta T_i$ contribution from $a_i$ (TSH) multiplied by $p_i$. Thus for a victim j the total temperature gradient is:

$$\Delta T_j = \Sigma_{i=1}^{N} a_i(\Delta T_i)p_i + s_i \Delta T_E \quad (5)$$

Where the last term represents the environment based value that can be superposed to account for local contributions of temperature from surrounding sources including cooling elements that can provide a negative ΔTE. Ambient thermal temperatures per region of the chip or package may be applied to account for the device and/or thermal management temperature gradient contributions. Thus the output of the full scale thermal solve with scalable thermal models provides a set of interconnects and their associated temperatures.

Figure 6:
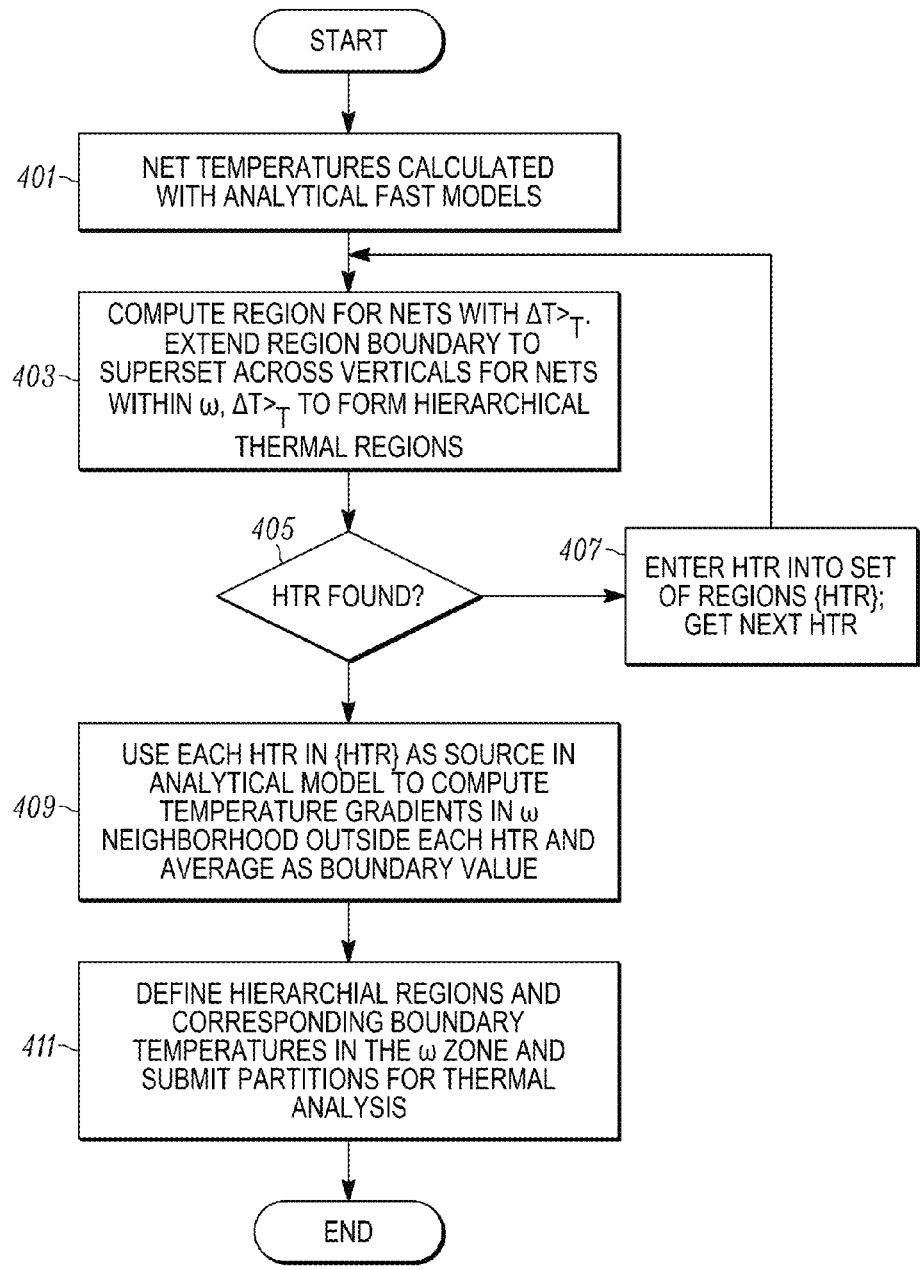
FIG. 6 is a flowchart illustrating an example of searching for partitions or hierarchical thermal regions according to an embodiment of the present disclosure.

A hierarchical function for iterative use for the analytical models is also provided. The operations are described in FIG. 6. Manufacturers of semiconductor chips and package parts determine temperature limits for specified lifetime reliability. Shown in block 401, the net temperatures are calculated using the analytical fast models shown above. Interconnect temperatures exceeding such threshold values are identified at each level of the design stack; interconnects within specified spatial bounds ω that are above the threshold are collected into a common region called hierarchical thermal region (HTR) shown in FIG. 6. The region is compared in the vertical direction, shown in block 403 and any interconnect identified to be within ω is included in the region by extending the hierarchical region to include the coordinates of interconnects with temperatures in excess of the manufacturers bounds τ. Such HTR's are stored in the list of HTR's, shown in block 407.

Hierarchical Modeling with Analytical Models

The HTR regions are used in the next iteration, shown in block 409, as input to the fast analytical solver much the same way in which representative interconnects were. The power of the hierarchical region is the sum of the power dissipated by interconnects within the extended HTR per layer, with respective equivalent layer conductivities to obtain temperature regions extending into the bordering regions by ω amount in the order independent manner as outlined above. The weighted average of the boundary temperatures across the layers is calculated using characterized weighting factors corresponding to the vertical interconnect contributions. The resulting region represents an adiabatic boundary temperature condition and is independent of the order in which it is computed.

Figure 7:
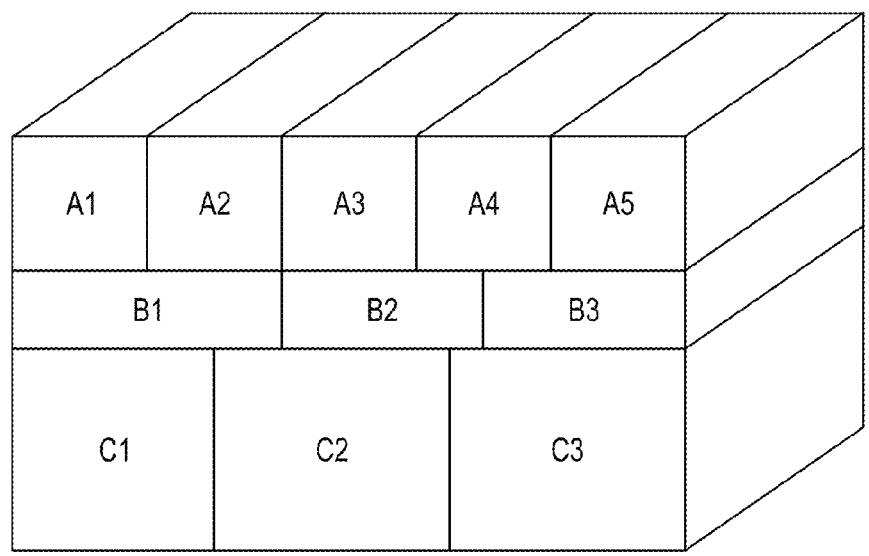
FIG. 7 is an exemplary drawing of multiple hierarchical thermal regions according to an embodiment of the present disclosure.

Shown in block 411, the HTR's are subjected to detailed analysis. This is an optional operation and in some cases the foregoing analysis may find no interconnect to be in violation of the design limits or that the analytical solution may be sufficiently accurate for purposes of making design decisions and taking corrective actions or waiving them as the case may be. In the interest of scalability the output from box 6 (FIG. 9) offers a parallel analysis methodology which is scalable with the number of processing units that can be assigned to the thermal solver and on the availability of thermal solvers that can be assigned to a HTR in parallel. In an embodiment, each of the HTR's is subjected to the detailed analysis. In an embodiment, only certain HTR's are subjected to the detailed analysis, based at least in part on temperature values of the HTR. For example, and without limitation, if HTR zones B2 and A3 in FIG. 7 were at or above a threshold temperature value, then those HTR's may be subjected to further analysis. If the remainder of the HTR's in FIG. 7 were not at or above the temperature, then they may not be subjected to the detailed analysis.

Analysis Flows with Scalable Thermal Analysis

In an embodiment of the disclosure, an example of using fast thermal solver with and without thermal simulation is provided. 2D chip methodologies and extraction tools (which write out standard physical SPEF) are restricted to a coordinate system that has its origins within the chip. However, chip-package analysis that uses a unified approach requires that the extraction of the resistive components with global coordinates for facilitating the annotation and reporting of temperature values throughout the interconnects in the system. The use of a top level design integration may also be considered where a reference plane which may be contained within any of the components such as a chip or the package and other component origins are translated linearly or rotated with respect to the reference plane's origins. This scheme allows for current SPEF extraction to be augmented with coordinates and extracted parasitic values of the chip-package interconnect structures. The SPEF with global coordinates may be used in the power estimation. Thermal time-constants across the different components are associated with the resistor coordinates as they are in a global context. Power analysis uses this information to calculate the average power per instance.

Functional components of an analysis flow based in the use of fast analytical model based solver and illustrates the ease of interchanging a regular thermal solver with a fast thermal solver in a plug-and-play mode may also be provided. The data generation and learning effort for using the tool is minimized by retrofitting an existing reliability evaluation design automation flow with a fast thermal solver.

Figure 4:
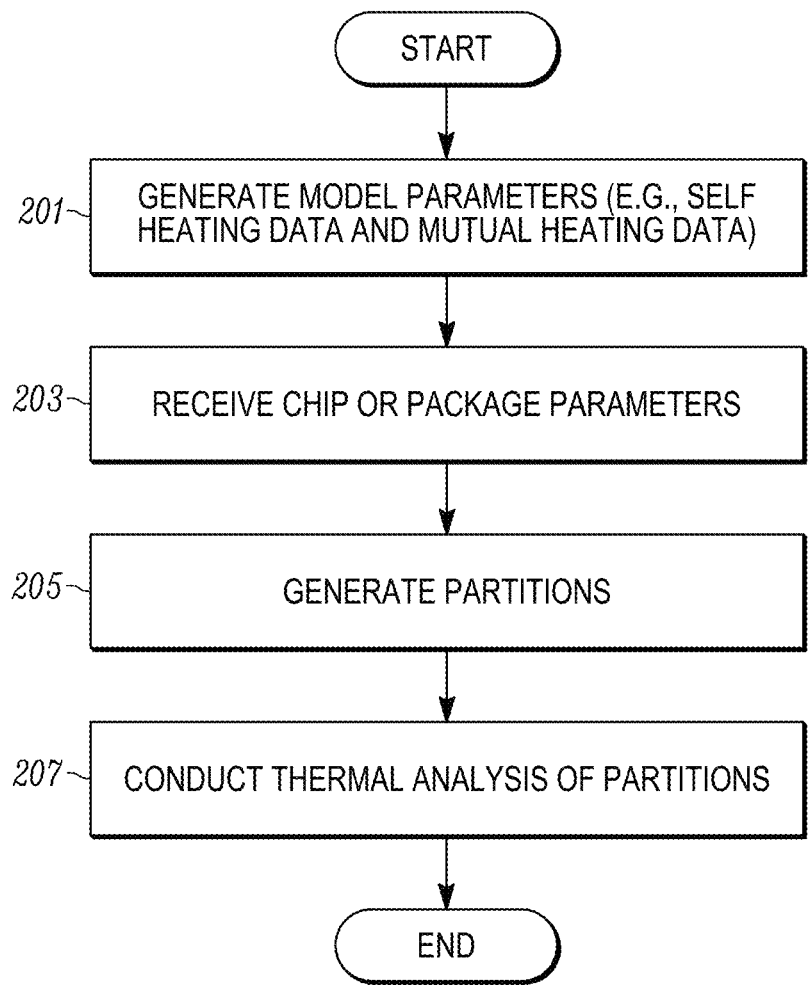
FIG. 4 is a flowchart illustrating an example of a method for calculating thermal values for IC interconnects according on an embodiment of the present disclosure.

Referring back to FIG. 4, a flowchart illustrating an example of a method for determining thermal values according on an embodiment of the present disclosure is shown. In block 201, the model parameters may be calculated. The model parameters, in an embodiment and as shown above, may include the techfile. In block 203, integrated circuit or chip parameters are provided. In an embodiment, the integrated circuit or chip parameters may include other parameters regarding the specific interconnects that are used in the integrated circuit, or other data regarding the integrated circuit, package, or other parameters that influence the thermal design of the overall product, such as cooling products, ambient temperature, or location to other components. In block 205, the partitions are calculated. The partitions, or HTR's, form a smaller unit of the entire integrated circuit or integrated circuit package. Block 205 ends with thermal values for each of the partitions. In block 207, analysis of the thermal values indicates which partitions may require further analysis. For example, and without limitation, a partition with a high thermal value may be subjected to more detailed analysis, while a partition with a lower thermal value may not be subjected to a more detailed analysis.

Figure 5:
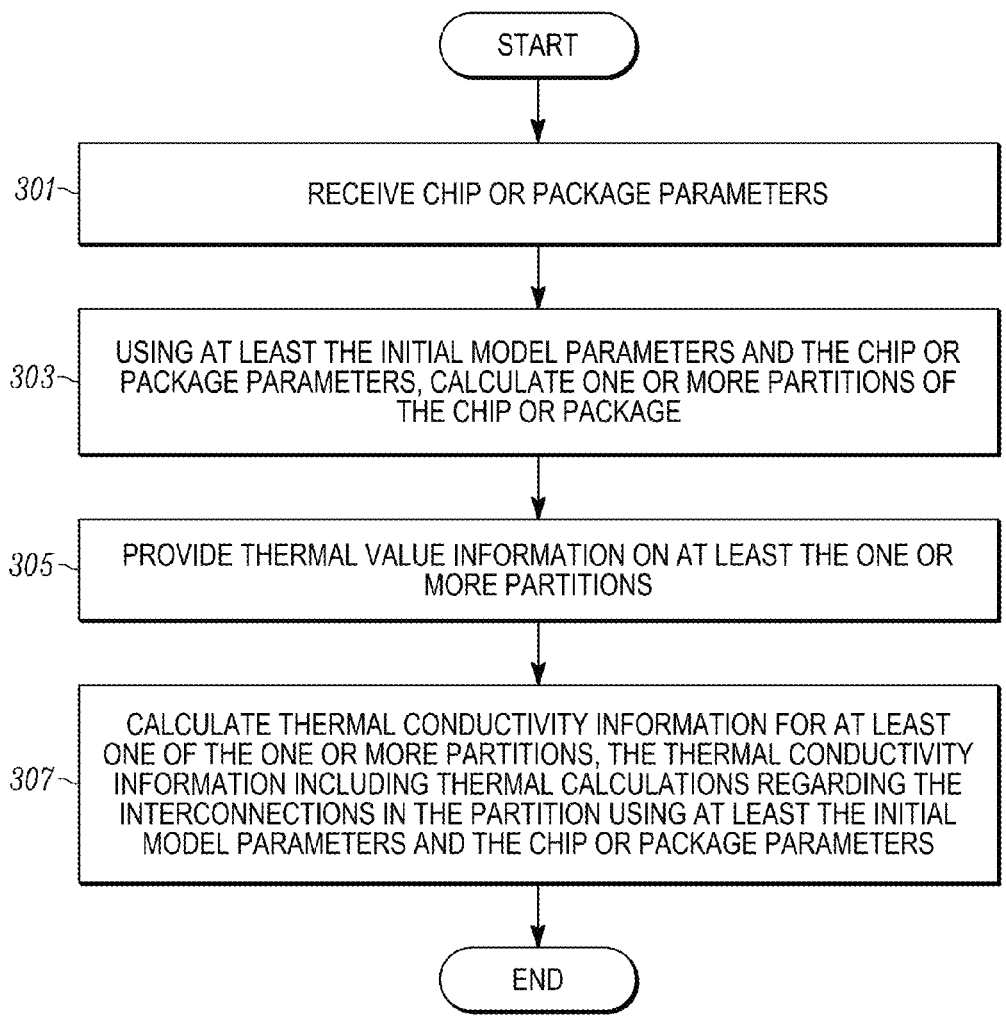
FIG. 5 is a flowchart illustrating an example of a method for calculating thermal values and partitioning the interconnects into partitions according to an embodiment of the present disclosure.

FIG. 5 is a flowchart illustrating an example of a method for calculating thermal values and partitioning the interconnects into partitions according to an embodiment of the present disclosure shown in FIG. 3. In block 301, chip or package parameters are received or obtained from memory (e.g., FIG. 9, 902). The integrated circuit or chip parameters may include other parameters regarding the specific interconnects that are used in the integrated circuit, or other data regarding the integrated circuit, package, or other parameters that influence the thermal design of the overall product, such as cooling products, ambient temperature, or location to other components. In block 303, model parameters and the chip or package parameters are used to calculate one or more partitions of the chip or package. Thermal models output from the said thermal builder is used. The thermal models provide apriori estimates of thermal field and interaction between the interconnects in the chip-package design. The regions with maximum thermal interaction among the power sources based on a threshold form a partition and are separated from the other partitions which have lesser degrees of interaction with all the members of the portioned region. In block 305, thermal value information is provided for the at least one or more partitions. The thermal information is provided to the power sources such as interconnect resistances carrying electrical current producing Joule heating. In block 307, detailed thermal analysis of each of the partitions may occur in parallel, as the partitions are calculated so that the thermal values of the partition to not greatly affect the neighboring partitions—that is, the partitions may be evaluated in isolation from one another. Thermal values are used for ensuring that the design meets the specification for temperature, operating margins, leakage power envelope, electrical current density in interconnects, estimation of electromigration reliability, time-dependent dielectric breakdown, thermal stress on stacked die interconnects such as TSVs, and determining other product life time estimates that are temperature dependent.

A graphic user interface may be employed as set forth below to facilitate operation. Temperature aware regions that are described herein are used to visualize region specific data such as temperature hotspots with graphical and textual data displaying useful information on the causes and suggesting potential design changes to reduce hotspots.

The interface provides view areas of interest in the design by expanding on thermal aggressor and victim elements and their respective contributions to the hotspots, and characteristics of the power sources such as power, shape factors, power densities and temperature impact on designs such as timing, leakage power and reliability failure rates.

Most thermal interfaces show the temperature data on physical design partitions, the ability to present data on thermally aware regions of the design is novel, further insightful information of thermal contributors based on self and mutual heating within and between regions is novel. This section describes a User Interface employing novel methods of design partitioning; where the partitions are created according to thermal fields associated with interconnect topologies and their context and displaying the data in a meaningful way to users.

The user interface is intended to help users to find temperature issues in their designs and to minimize the design effort by displaying modifications with highest impact on the thermal margins. It consists of context based 2D plots, 3D graphics, histograms, error plots, dependency diagrams, surface plots, contour diagrams, text, HTML, XML, hyper links showing design regions and associated design data to provide insights to users: the interface displays views of interconnect structures that contribute significantly to hot spots regions and include metal segments, vias, contacts, microbumps, TSV (Through Silicon Vias), RDL (redistribution layer), wire-bonding pads, bump pads, BEOL(Back End Of Line), FEOL(Front End Of Line), flip chip bumps as well as devices.

Thermally aware partitions may display all or parts of a particular material layers within a stacked die, or within a particular integrated chip within the stacked die. Further the regions may be ranked based on specific thermal criteria such as average, min, max temperatures, temperature gradients, and temperature differences in horizontal and vertical planes. show areas of interest based on user criteria. The regions contain material layers within stacked die, and material layers within each chip-package layer in 3D and/or 2D based on temperatures values, which may be max, min, average temperatures, and/or temperature gradients.

The ranked partitions may in some or all cases show interaction with neighboring regions within the same material layer and/or between regions in other material layers surrounding the said regions. The surrounding regions may be in the horizontal or vertical planes.

Within any of the said regions the display may show any interconnect segment or subsection of the segment, such as an extracted resistor, length of interconnect, temperature value and the contributing heat sources to the interconnect temperature is shown with colored coded arcs. The colors indicate the relative values of contribution. A directed arc from a heat source A to heat source B indicates that A contributes to the temperature of B due to transfer of heat energy. The color coding of the arcs (E.g. red, yellow, green, blue may indicate that a red color arc contributes a higher temperature component contribution to B than a blue colored arc from another heat source C to B). On right clicking of the mouse on the arc the actual contribution is shown in the GUI. On right clicking the mouse on A one can see all the aggressing heat sources, rank ordered based on a predetermined criterion. An arc emanating from a heat source and terminating on it represents the self-heating of the heat source.

Users can easily find interconnects whose power density and cooling effects are imbalanced due to either power density exceeding a limit or because of highly thermal resistive to the heat sink. Users can easily identify elements that have a greater portion of its temperature raised due to mutual heating from another dominant heat source. To lower the temperature value it would for example have the maximum benefit to increase the width of the aggressor metal interconnect so that the temperature of the aggressor affecting most victims is reduced, thereby reducing the heating effect on all its victim wires. In another example re-routing the aggressor-interconnect a further distance from the victim can lead to minimum change in the layout of the chip. Users can re-route strong aggressors where possible to avoid over heating of victim interconnect. The methods described above involving characterized heating models to identify regions of thermal aggressor/victim sets are output in the user interface to view the dependency information described in the above sections.

Suggested lists of user interface features are described as follows:

Pull down menus to provide for users to view the following:

Statistics on thermal aggressors and victims per region and across all regions a. For each victim the contributing aggressors are ranked in terms of their effect b. The victims are ranked based on the thermal budget, where the thermal budget is the difference between the victims temperature and a user defined threshold; or thermal budget being derived from life time estimates and models which estimate the temperature limits c. Recursive unfolding of aggressors to show their aggressors and respective thermal contribution d. With each view pull down option allows viewing of ranked regions, ranked interconnects, temperature effects on leakage current, electromigration failure rate, dielectric breakdown and other thermal driven design parameters which are provided by technology specialists, manufactures and designers to the tool e. Options to view correlation statistics between the above parameters Suggested design changes for minimizing temperature or temperature gradient Interconnects, as known in the art, may include signal lines, vias between chip layers, connects between two metals such as different layers within a chip and electrical connections between chips. As noted above, temperature fields are determined for a partition based on a sphere of thermal influence. The system provides a model of how to partition an integrated circuit into partitions of thermal influence. Partitions may be based on circuit functionality, a physical area of interest of the circuit or a thermal area wherein a area of an integrated circuit or package is partitioned such that thermal influence to other areas is low so that one partition, for example, may not thermally impact another. The system can readily evaluate thermal interactions between partitions.

As illustrated in FIG. 1, a package is shown that includes an integrated circuit 150, such as a graphics processing unit, other integrated circuit chips generally shown as 152 and in this example, show multiple DRAMs and a logic die that are vertically stacked, an interposer 154 is shown between the integrated circuit and another package. Microbumps and balls are illustrated. The stacked chips may include internal metal interconnections and as shown there are chip package level interconnection structures. The above integrated circuit package as well as the individual integrated circuits may be fabricated in response to the partitioning scheme set forth above.

Disclosed above, the method and apparatus generates thermal partitions for interconnects based on self heat data and mutual heat data. The thermal partitions comprise thermally related interconnects and respective temperature values. Hence, there is a temperature value provided for each interconnect for those interconnects determined to be in a thermal partition. The thermal partitions include the set of interconnect segments that influence one another.

The methods performed, for example, by computing apparatuses as indicated above determine integrated circuit thermal values for interconnects. The method can also include receiving initial model parameters that represent temperature fields associated with the interconnects, receiving chip and/or package parameters and using at least the initial model parameters and the chip and/or package parameters to calculate one or more thermal partitions of the chip and/or package. Thermal partitions may be produced by determining an amount of thermal interaction between interconnects and grouping the interconnects into thermal partitions. As such, the thermal partitions include a collection of interconnects that thermally impact each other. The thermal partitions may then be analyzed to performance and reliability of the chip and/or package designs. The thermal information on a per-segment basis for partition may be used as described above. The method also includes storing the thermal value information in the partitions in memory. The method may also include determining thermal violations for interconnects based on the thermal value information from the thermal partitions. This may be done, for example, by an electro migration analysis processes as known in the art. A circuit and/or package layout may then be revised where it is determined that partitions or thermal segments in the partitions violate manufacturer thermal rules for example. This may include changing the material or dimension of the thermal interconnect or any other suitable change in structure or location as desired.

The method may include performing the thermal calculations for the partitions in parallel as well as providing an alert if the thermal value information for one or more partitions exceeds a threshold value. Initial model parameters may include, for example, a distance between interconnects, thermal properties of materials that comprise the interconnects, geometry dependent variations of the interconnects or other suitable data. The initial amount of parameters may include, for example, dimensions of the stack in terms of length, width, height and/or radius, slopes, orientation and relative positions of the stack with each other, the semiconductor chip material composition within material layers, interconnect topology information and other suitable information. The method may include determining thermal values of each class of interconnect topology, storing the determined thermal values for the interconnect topologies and applying to the stored thermal values of interconnect topologies into partitions of the chip package interconnects to determine thermal values with respect to thermal partitions. Chip or package parameters may include, but are not limited to, package thermal resistances, dimensions, direct heat flux, microbump locations and thermal material constants and dimensions, spreader/heat sink dimensions, locations and thermal constants of materials from which the interconnect is made, bond wire dimensions, thermal conductivity and any other suitable package parameters.

The method and apparatus above may receive initial model parameters, receive chip or package parameters, use the initial model of parameters in a chip or package parameters to calculate the one or more thermal partitions of the chip or package parameters. The method and apparatus may provide thermal value information on the one or more partitions.

A computer readable storage medium such as RAM, ROM may include executable instructions that when executed by one or more processors cause the one or more processors such as one or more processors in the work station or other suitable computing system to perform the operations described above.

In addition, a stacked die assembly such as the ones from FIG. 1 may be produced in response to the partitioning methods described above. As such, a stacked die assembly may be made by generating thermal partitions for metal interconnects based on interconnect self heat data and interconnect mutual heat data wherein the thermal partitions comprise thermally related thermal interconnects and representative temperature values. The stacked die assembly may be made by fabricating a stacked die assembly that employs on die and inter die interconnections based on the thermal value information from the one or more partitions.

Examples attached hereto show examples showing virtual probe placement to determine simulated temperature values (FIGS. 17 and 18).

Among other advantages, the present disclosure may allow faster and more parallelized thermal value evaluations for large integrated circuits or packages of one or more integrated circuits. The faster evaluation ma y allow for more or faster error checking for integrated circuits, which may lead to a higher mean time between failure for the integrated circuits. Other advantages will be recognized by those of ordinary skill in the art.

Among other advantages, conduct design evaluation of full SOC and stacked die chip design for cost versus reliability tradeoffs. Provide characterized database of interconnect thermal analysis models per design technology (node) and package architecture for consistent application to chip, package and chip-package interconnects for comparative analysis of design quality versus cost. The database can be used for multiple projects and architectures by retrofitting existing flows with the analytical models in place of existing thermal solvers. Analyze magnitude of potential thermal gradients and hotspots at chip and package levels and enable thermally-aware floorplanning, including through silicon via (TSV) placements. Provide comparative evaluation of different package architectures for mechanical and electrical robustness in the presence of potential thermal gradients and hotspots. Provide comparative evaluation of chip assignments to different level tiers within stacked chip designs to analyze the resulting thermal impact on interconnect failure rates. Provide temperature data across interconnects for evaluation of failure rates and statistical budgeting to improve performance of design. Analyze microbump temperatures across the stacked chip design to identify electromigration and thermo-mechanical reliability risks and enable design modifications to fix them. Automate thermally aware design partitioning with boundary conditions such that they can be submitted for computational analysis in order-independent manner on parallel computing resources. Provide thermal data for interconnects at the product level for improved thermal management of the system. Use consistent power data based n thermal time constants and logical state dependency between the power sources. Distribute estimated power consistent with thermal time constants and logical state dependency between the power sources. Distribute estimated power consistent with thermal time constants and logical states of two or more interconnects within a stacked chip design to improve accuracy of thermal analysis results. Develop and evaluate reliability test structures using fast evaluation and modification prior to detailed analysis.

The above detailed description of the disclosure and the examples described therein have been presented for the purposes of illustration and description only and not by limitation. It is therefore contemplated that the present disclosure cover any and all modifications, variations or equivalents that fall within the spirit and scope of the basic underlying principles disclosed above and claimed herein.

What is claimed is:

1. A method, performed by an apparatus, for determining integrated circuit (IC) thermal values for metal interconnects of the IC comprising:
generating thermal partitions for metal interconnects of the integrated circuit, based on interconnect self heat data and mutual heat data, wherein each of the thermal partitions comprises data identifying thermally related interconnects and respective temperature values associated with each of the thermally related interconnects;
wherein generating thermal partitions comprises:
determining a per interconnect temperature for an interconnect of interest using the interconnect self heat data and mutual heat data from interconnects at a desired distance from the interconnect for all interconnects per interconnect layer;
forming a thermal region that is comprised of aggressor interconnects to the interconnect of interest when the interconnect temperature is determined to be above a threshold;
repeating the determining and forming operation to produce multiple thermal regions; and
combining intersecting regions that have a common interconnect to form a thermal partition.

2. The method of claim 1 wherein generating thermal partitions for metal interconnects of the integrated circuit comprises generating interconnect self heat data and mutual heat data; receiving integrated circuit or package parameters and wherein the method comprises determining whether thermal violations occur in a partition.

3. The method of claim 1 wherein the thermal partitions comprise a set of interconnect segments that influence each other based on a desired threshold and wherein the method comprises generating a plurality of partitions for the integrated circuit.

4. The method of claim 1 wherein the thermal partitions comprise segment material information, dielectric information, boundary condition information of a partition including boundary temperature information and power information per segment.

5. The method of claim 4 comprising displaying thermal information corresponding to the thermal partitions for metal interconnects of the integrated circuit whose thermal level is beyond a desired threshold.

6. The method of claim 1 comprising conducting a thermal analysis of the thermal partitions for metal interconnects of the integrated circuit; and displaying thermal information corresponding to the thermal partitions for metal interconnects of the integrated circuit to facilitate a design change in the interconnect layout of the integrated circuit.

7. An apparatus for determining integrated circuit thermal values for metal interconnects comprising logic operative to generate thermal partitions for metal interconnects of the integrated circuit, based on interconnect self heat data and mutual heat data, wherein each of the thermal partitions comprises data identifying thermally related interconnects and respective temperature values associated with each of the thermally related interconnects;
wherein the logic is operative to generate thermal partitions by:
determining a per interconnect temperature for an interconnect of interest using the interconnect self heat data and mutual heat data from other interconnects from the interconnect for all interconnects per interconnect layer;
forming a thermal region that is comprised of aggressor interconnects to the interconnect of interest when the interconnect temperature is determined to be above a threshold:
repeating the determining and forming operation to produce multiple thermal regions; and
combining intersecting regions that have a common interconnect to form a thermal partition.

8. The apparatus of claim 7 wherein the logic is operative to generate thermal partitions by generating interconnect self heat data and mutual heat data; receiving integrated circuit or package parameters and wherein the method comprises determining whether thermal violations occur in a partition.

9. The apparatus of claim 7 wherein the thermal partitions comprise a set of interconnect segments that influence each other based on a desired threshold.

10. The apparatus of claim 7 wherein the thermal partitions comprise segment material information, dielectric information, boundary condition information of a partition including boundary temperature information and power information per segment.

11. The apparatus of claim 7 wherein the logic is operative to conduct a thermal analysis of the thermal partitions for metal interconnects of the integrated circuit; and display the thermal information corresponding to the thermal partitions for metal interconnects of the integrated circuit to facilitate a design change in the interconnect layout of the integrated circuit.

12. A non-transitory computer readable medium comprising executable instructions stored therein that when executed by one or more processors, causes the one or more processors to: generate thermal partitions for metal interconnects of the integrated circuit, based on interconnect self heat data and mutual heat data, wherein each of the thermal partitions comprises data identifying thermally related interconnects and respective temperature values associated with each of the thermally related interconnects and to generate thermal partitions by:
determining a per interconnect temperature for an interconnect of interest using the interconnect self heat data and mutual heat data from other interconnects at a desired distance from the interconnect for all interconnects per interconnect layer;
forming a thermal region that is comprised of aggressor interconnects to the interconnect of interest when the interconnect temperature is determined to be above a threshold;
repeating the determining and forming operation to produce multiple thermal regions; and
combining intersecting regions that have a common interconnect to form a thermal partition.

* * * * *